US00RE39099E

(19) United States
(12) Reissued Patent
Krutchinsky et al.

(10) Patent Number: US RE39,099 E
(45) Date of Reissued Patent: May 23, 2006

(54) SPECTROMETER PROVIDED WITH PULSED ION SOURCE AND TRANSMISSION DEVICE TO DAMP ION MOTION AND METHOD OF USE

(75) Inventors: Andrew N. Krutchinsky, Winnipeg (CA); Alexandre V. Loboda, Toronto (CA); Victor L. Spicer, Winnipeg (CA); Werner Ens, Winnipeg (CA); Kenneth G. Standing, Winnipeg (CA)

(73) Assignee: University of Manitoba, Winnipeg (CA)

(21) Appl. No.: 10/236,514

(22) Filed: Sep. 6, 2002

Related U.S. Patent Documents

Reissue of:
(64) Patent No.: 6,331,702
Issued: Dec. 18, 2001
Appl. No.: 09/236,376
Filed: Jan. 25, 1999

(30) Foreign Application Priority Data

Jan. 23, 1998 (CA) ..... 2227806

(51) Int. Cl.
*H01J 49/40* (2006.01)

(52) U.S. Cl. ..... 250/281; 250/282; 250/287; 250/288

(58) Field of Classification Search ..... 250/281, 250/282, 287, 288, 292
See application file for complete search history.

(56) References Cited

U.S. PATENT DOCUMENTS 4,894,536 A * 1/1990 Conzemius ..... 250/287
4,963,736 A * 10/1990 Douglas et al. ..... 250/292
5,032,722 A * 7/1991 Boesl et al. ..... 250/287
5,073,713 A * 12/1991 Smith et al. ..... 250/282
5,206,508 A * 4/1993 Alderdice et al. ..... 250/287
5,521,382 A * 5/1996 Tanaka et al. ..... 250/292
5,663,561 A * 9/1997 Franzen et al. ..... 250/288
5,689,111 A * 11/1997 Dresch et al. ..... 250/287
5,777,324 A * 7/1998 Hillenkamp ..... 250/288
5,854,485 A * 12/1998 Bergmann ..... 250/287
5,905,258 A * 5/1999 Clemmer et al. ..... 250/287
5,962,851 A * 10/1999 Whitehouse et al. ..... 250/288
5,965,884 A * 10/1999 Laiko et al. ..... 250/288

FOREIGN PATENT DOCUMENTS

GB 2 299 446 * 10/1996
WO WO 99/30350 * 6/1999

OTHER PUBLICATIONS

Krutchinsky, A.N. et al. "Rapidly Switchable MALDI and Electrospray Quadrupole–Time–Of–Flight Mass Spectrometry for Protein Identification", Journal of the American Society for Mass–Spectrometry, Online Feb. 10, 2000.*

(Continued)

*Primary Examiner*—Kiet T. Nguyen
(74) *Attorney, Agent, or Firm*—Leydig, Voit & Mayer, Ltd.

(57) ABSTRACT

A method and apparatus are provided for providing an ion transmission device or interface between an ion source and a spectrometer. The ion transmission device can include a multipole rod set and includes a damping gas, to damp spatial and energy spreads of ions generated by a pulsed ion source. The multipole rod set has the effect of guiding the ions along an ion path, so that they can be directed into the inlet of a mass spectrometer. The invention has particular application to MALDI (matrix-assisted laser desorption/ionization) ion sources, which produce a small supersonic jet of matrix molecules and ions, which is substantially non-directional, and can have ions travelling in all available directions from the source and having a wide range of energy spreads. The ion transmission device can have a number of effects, including: substantially spreading out the generated ions along an ion axis to generate a quasi-continuous beam; reducing the energy spread of ions emitted from the source; and at least partially suppressing unwanted fragmentation of analyte ions. Consequently, a number of pulses of ions can be delivered to the time-of-flight or other spectrometer, for each cycle of the ion generation.

33 Claims, 15 Drawing Sheets

OTHER PUBLICATIONS

Mlynski, V. et al. "Matrix–assisted Laser/Desorption Ionization Time–of–flight Mass Spectrometer with Orthogonal Acceleration Geometry: Preliminary Results", Rapid Communications in Mass Spectrometry, vol. 10, 1524–1530 (1996).*

Spengler, B. et al. Ultraviolet Laser Desorption/Ionization Mass Spectrometry of Proteins above 100 000 Daltons by Pulsed Ion Extraction Time–of–Flight Analysis, American Chemical Society, 62, 793–769 (1990).*

Shevchenko, A. et al. "MALDI Quadrupole Time–of–Flight Mass Spectrometry: A Powerful Tool for Proteomic Research", American Chemical Society (2000), Analytical Chemistry A–J.*

Dworschak, R.G. et al. "Orthogonal Injection MALDI", 43rd ASMA Conference on Mass Spectrometry and Allied Topics, 1216.*

Loboda, A.V. et al. "A tandem quadrupole/time–of–flight mass spectrometer with a matrix–assisted laser desorption/ionization source: design and performance", Rapid communications Mass Spectrometrom, 14, 1047–1057 (2000).*

Krutchinsky et al. "Collisional Damping Interface for an Electrospray Ionization Time–of–Flight Mass Spectrometer", American Society for Mass Spectrometry, 1998.*

Krutchinsky, A.N. et al. "Orthogonal Injection of Matrix–assisted Laser Desorption/Ionization Ions into a Time–of–Flight Spectrometer Through a Collisional Damping Interface", Rapid Communications in Mass Spectrom. 12, 508–578 (1998).*

Shevchenko, Andrej et al. Rapid 'de Novo' Peptide Sequencing by a Combination of Nanoelectrospray, Isotopic Labeling and a Quadrupole/Time–of–Flight Mass Spectrometer, Rapid Communications in Mass Spectrometry, vol. 11, 1015–1024 (1997).*

Vestal, M.L. et al. "Delayed Extraction Matrix–assisted Laser Desorption Time–of–Flight Mass Spectrometry", Rapid Communications in Mass Spectrometry, vol. 9, 1044–1050 (1995).*

Hillenkamp, Franz et al. "Matrix–Assisted Laser Desorption/Ionization Mass Spectrometry", Analytical Chemistry, vol. 63, No. 24, Dec. 15, 1991.*

1996 ASMS Conference, Abstract Entry.

*The University of Manitoba MDS Inc. et al.* v. *Waters Technologies Corporation et al.,* Complaint, 2002.

*The University of Manitoba MDS Inc. et al.* v. *Waters Technologies Corporation et al.,* Answer and Counterclaim of Defendants Waters Technologies Corporation and Micromass UK ltd., 2003.

*The University of Manitoba MDS Inc. et al.* v. *Waters Technologies Corporation et al.,* Plaintiff's Reply to Waters Technologies Corporation and Micromass UK Ltd.'s Counterclaims, 2003.

* cited by examiner

FIG. 7A
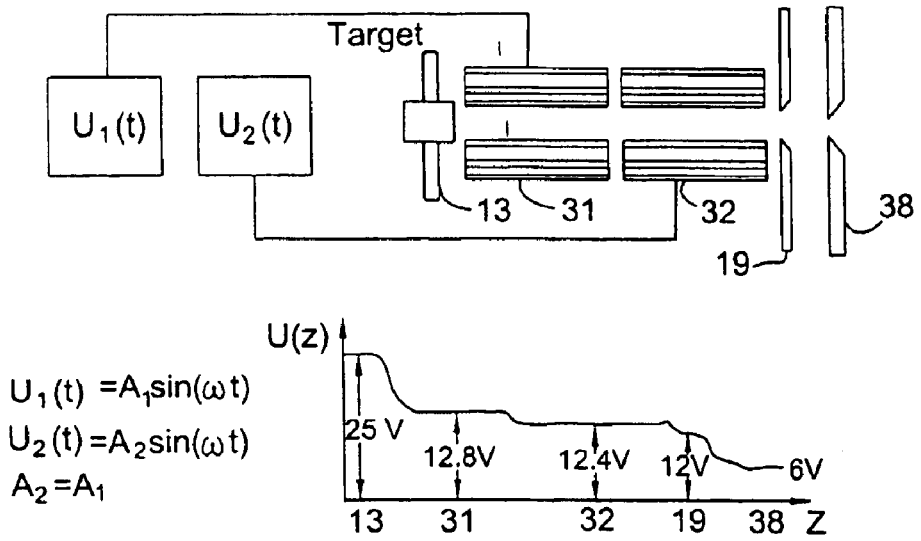
FIG. 7B
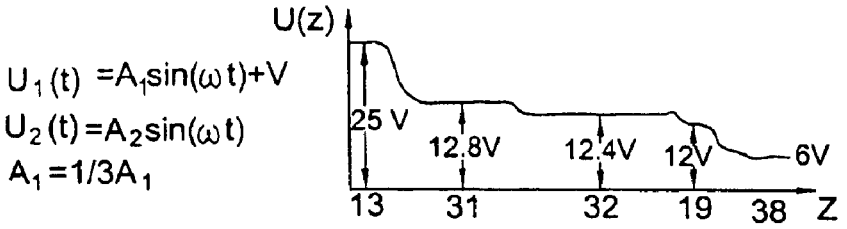
FIG. 7C
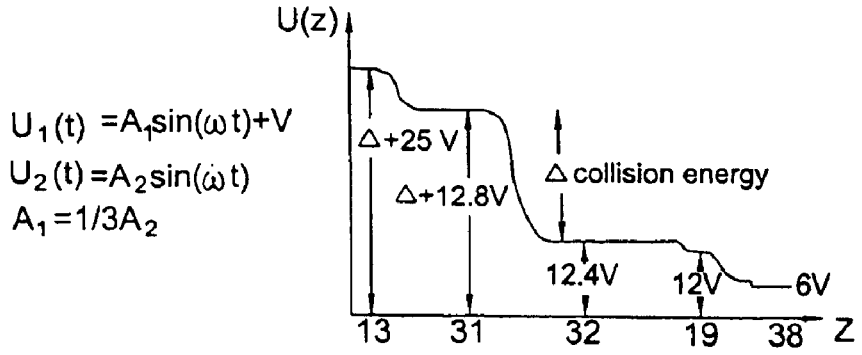
FIG. 7D 1347.74
40000
20000
219.13
1330.72
1094.59 1116.58
0

1500
0

20000
x56
10000
0

500
0
200
400
600
800
1000
1200
1400
m/z 122
123
121
5000

122
1000

200
0
500
1000
1500
2000
2500
m/z

SPECTROMETER PROVIDED WITH PULSED ION SOURCE AND TRANSMISSION DEVICE TO DAMP ION MOTION AND METHOD OF USE

Matter enclosed in heavy brackets [ ] appears in the original patent but forms no part of this reissue specification; matter printed in italics indicates the additions made by reissue.

FIELD OF THE INVENTION

This invention relates to mass spectrometers and ion sources therefor. More particularly, this invention is concerned with pulsed ion sources and the provision of a transmission device which gives a pulse ion source many of the characteristics of a continuous source, such that it extends and improves the application of Time of Flight Mass Spectrometry (TOFMS) and that it additionally can be used with a wide variety of order spectrometers, in addition to an orthogonal injection time-of-flight mass spectrometer.

BACKGROUND OF THE INVENTION

Ion sources for mass spectrometry may be either continuous, such as ESI (electrospray ionization) sources or SIMS (secondary ion mass spectrometry) sources, or pulsed, such as MALDI (matrix-assisted laser desorption/ionization sources). Continuous sources have normally been used to inject ions into most types of mass spectrometer, such as sector instruments, quadrupoles, ion traps and ion cyclotron resonance spectrometers. Recently it has also become possible to inject ions from continuous sources into time-of-flight (TOF) mass spectrometers through the use of "orthogonal injection", whereby the continuous beam is injected orthogonally to the main TOF axis and is converted to the pulsed beam required in the TOF technique. This is most efficiently carried out with the addition of a collisional damping interface between the source and the spectrometer, and this is described in the following paper, having four authors in common with the present invention (Krutchinsky A. N., Chernushevich I. V., Spicer V. L., Ens W., Standing K. G., Journal of the American Society for Mass Spectrometry, 1998, 9, 569–579).

On the other hand, pulsed sources, MALDI sources for example, have usually been coupled directly to TOF mass spectrometers, to take advantage of the discrete or pulse nature of the source. TGIF mass spectrometers have several advantages over conventional quadrupole or ion trap mass spectrometers. One advantage is that TOF mass spectrometers can analyze a wider mass-to-charge range than do quadrupole and ion trap mass spectrometers. Another advantage is that TOF mass spectrometers can record all ions simultaneously without scanning, with higher sensitivity than quadrupole and ion trap mass spectrometers. In a quadrupole or other scanning mass spectrometer, only one mass can be transmitted at a time, leading to a duty cycle which may typically be 0.1%, which is low (leading to low sensitivity). A TOF mass spectrometer therefore has a large inherent advantage in sensitivity.

However, TOF mass spectrometers encounter problems with many widely used sources which produce ions with a range of energies and directions. The problems are particularly acute when ions produced by the popular MALDI (matrix-assisted laser desorption/ionization) technique are used. In this method, photon pulses from a laser strike a target and desorb ions whose masses are measured in the mass spectrometer. The target material is composed of a low concentration of analyte molecules, which usually exhibit only moderate photon absorption per molecule, embedded in a solid of liquid matrix consisting of small, highly-absorbing species. The sudden influx of energy is absorbed by the matrix molecules, causing them to vaporize and to produce a small supersonic jet of matrix molecules and ions in which the analyte molecules are entrained. During this ejection process, some of the energy absorbed by the matrix is transferred to the analyte molecules. The analyte molecules are thereby ionized, but without excessive fragmentation, at least in the ideal case.

Because a pulsed laser is normally used, the ions also appear as pulses, facilitating their convenient measurement in a tune-of-flight spectrometer. However, the ions acquire a considerable amount of energy in the supersonic jet, with velocities of the order of 700 m/s, and they also may lose energy through collisions with the matrix molecules during acceleration, particularly in high accelerating fields. These and similar effects lead to considerable peak broadening, and consequent loss of resolution in a simple linear time-of-flight instrument, where the ions are extracted from the target nearly parallel to the spectrometer axis. A partial solution to the problem is provided by a reflecting spectrometer, which partially corrects for the velocity dispersion, but a more effective technique is the use of delayed extraction, either by itself or in combination with a reflector. In delayed extraction, the ions are allowed to drift for a short period before the accelerating voltage is applied. This technique partially decouples the ion production process from the measurement, making the measurement less sensitive to the detailed pattern of ion desorption and acceleration in any particular case. Even so, successful operation requires careful control of the laser fluence (i.e. the amount of power supplied per unit area) and usually some hunting on the target for a favorable spot. Moreover, the extraction conditions required for optimum performance have some mass dependence; this complicates the calibration procedure and means that the complete range of masses cannot be observed with optimum resolution at any given setting. Also, the technique has had limited success in improving the resolution for ions of masses greater than about 20,000 Da. Moreover, it is difficult to obtain high performance MS—MS data in conventional MALDI instruments because ion selection and fragmentation tend to broaden the fragment peak width. The present inventors have realized that these problems can be overcome by abandoning the attempt to maintain the original pulse width, producing instead a quasi-continuous beam with superior characteristics, and then pulsing the injection voltage of the TOF device at an independent repetition rate.

Although coupling to a TOF instrument is used as an example above, problems also arise in coupling MALDI and other pulsed sources to other types of mass spectrometer, such as quadrupole (or other multipole), ion trap, magnetic sector and FTICRMS (Fourier Transform Ion Cyclotron Resonance Mass Spectrometer). Further, it is also desirable to be able to couple MALDI or other pulsed sources to tandem mass spectrometers, e.g. a triple quadrupole or a quadrupole TOF hybrid instrument, which allows MS/MS of MALDI ions to be obtained. Standard MALDI instruments cannot be configured to carry out high performance MS/MS. The dispersion in, energy and angle of ions produced by a MALDI source, or similar source, accentuates the difficulty of ion injection. Also, because the residence times of ions in most other types of mass spectrometer are considerably longer than in TOF instruments, the large space charge in the pulse can introduce additional problems. These instruments are all designed to operate with continuous sources, so conversion of the pulsed source to a quasi-continuous one solves most of the problems.

BRIEF SUMMARY OF THE PRESENT INVENTION

Accordingly, it is desirable to provide an apparatus and method enabling a pulse source, such as a MALDI source, to be coupled to a variety of spectrometer instruments, in a manner which more completely decouples the spectrometer from the source and provides a more continuous ion beam with smaller angular and velocity spreads.

More particularly, it is desirable to provide an improved TOF mass spectrometer with a pulsed ion source, in which the energy spread in the ion beam is reduced, in which the source is more completely decoupled from the spectrometer than in existing instruments, in which problems resulting from ion fragmentation are reduced, enabling new types of measurement, and in which the results obtained from the mass spectrometer and its ease of operation are consequently improved.

It is also desirable to provide a TOF mass spectrometer with both continuous and pulsed sources, for example both ESI and MALDI sources, so either source can be selected.

In accordance with the present invention, there is provided a mass spectrometer system comprising:

a pulsed ion source, for providing pulses of analyte ions;

a mass spectrometer;

an ion path extending between the ion source and the mass spectrometer; and an ion transmission device located in said ion path and having a damping gas in at least a portion of the ion path, whereby there is effected at least one of: a reduction in the energy spread of ions emitted from said ion source; conversion of pulses of ions from the ion source into a quasi-continuous beam of ions; and at least partial suppression of unwanted fragmentation of analyte ions.

The invention has particular applicability to time of flight mass spectrometers. As these require a pulsed beam, conventional teaching is that a pulsed source should be coupled maintaining the pulsed characteristics. However, the present inventors have now realised that there are advantages to, in effect converting a pulsed beam into a continuous, or at least quasi-continuous, beam, and than back into a pulsed beam. The advantages are: improvement in beam quality through collision damping; decoupling of the ion production from the mass measurement; ability to measure the beam current by single-ion counting; because it is converted from a few large pulses to many small pulses, for example from about 1 Hz to about 4 kHz., or a factor of 4,000; compatibility with a continuous source , such as ESI, offering the possibility of running both sources on one instrument.

The invention also bas applicability to mass spectrometers that work with or require a continuous beam. Then, the advantage is that a pulsed source can indeed be used with such spectrometers.

Preferably, the ion source provides the analyte for ionization by radiation, and there is provided a source of electromagnetic radiation, more preferably a pulsed laser, directed at the ion source, for generating radiation pulses to cause desorption and ionization of analyte molecules.

Advantageously, the ion source comprises a target material composed of a matrix and analyte molecules in the matrix, the matrix comprising a species adapted to absorb radiation from the radiation source, to promote desorption and ionization of the analyte molecules.

Preferably, the transmission device comprises a multipole rod set There can be two or more multipole rod sets and means for supplying different RF and DC voltages to the rod sets.

Collisional damping can also be accomplished in a chamber where no RF field is present providing there is enough buffer gas pressure. In this case ions with reduced velocities can be moved to the exit of the chamber by gas flow drag or a DC electrostatic field Combinations of electrostatic fields, RF fields and gas flow can also be implemented in a collisional damping chamber.

Another advantage of the invention is that the collisional cooling of the ions helps to reduce the amount of fragmentation of the molecular ions. It is usually desirable to produce a simple mass spectrum containing only ions representative of molecular species. In typical MALDI ion sources, therefore, the laser power must be carefully optimized so that it is close to the threshold of ionization in order to reduce fragmentation. The inventors have observed, however, that the presence of a gas around the sample surface greatly assists in reducing fragmentation, even at relatively high laser power. Presumably this is due to the effect of collisions with gas molecules which remove internal energy from the desorbed species before they can fragment. This means that the laser power can be increased in order to improve the ion signal strength, without causing excessive decomposition. The inventors have observed that the amount of fragmentation is decreased as the pressure is increased up to at least approximately 1 torr. Higher pressures may be even more advantageous, but electric fields may be required to avoid clustering reactions at higher pressure.

The mass spectrometer system can include a continuous ion source, and means for selecting one of the pulsed ion source and the continuous ion source, and this then provides the characteristics of two separate instruments in one instrument. The two ion sources can comprise a MALDI source and an ESI source.

Another aspect of the present invention provides a method of generating ions and delivering ions to a mass spectrometer, the method comprising the steps of:

(1) providing an ion source;

(2) causing the ion source to produce pulses of ions;

(3) providing an ion transmission device along an ion path extending from the ion source and providing the ion transmission device with a damping gas in at least a portion of the ion path, to effect at least one of: a reduction in the energy spread of ions emitted from said lion source; conversion of pulses of ions from the ion source into a quasi-continuous beam of ions; and at least partial suppression of unwanted fragmentation of analyte ions; and (4) passing ions from the ion transmission device into the mass spectrometer for mass analysis.

The gas pressure of the damping gas can be in the range from about $10^{-4}$ Torr up to at least 760 Torr. Preferably, step (3) comprises providing an RF rod set within the transmission device. Further, a DC field can be provided between the ion source and the spectrometer to promote movement of ions towards the spectrometer.

The method can include providing two or more rod sets in the ion transmission device, and operating at least one rod set with a DC offset to enable selection of ions with a desired mass-to-charge ratio. A potential difference can be provided between two adjacent rod sets sufficient to accelerate ions into the downstream rod set, to cause collisionally induced dissociation in the downstream rod set.

When a pulsed laser is used, for each laser pulse, a plurality of pulses of ions are delivered into the time-of-flight mass spectrometer.

The ions can first pass through one or more differentially pumped regions that provide a transition from the pressure at the ion source to pressure in the spectrometer. The ion source may be at atmospheric pressure or at least at a pressure substantially higher than that in downstream quadrupole stages and in the mass spectrometer. At least one of these regions can be without any rod set and ion motion towards the mass spectrometer is then driven by gas flow and/or an electrostatic potential.

BRIEF DESCRIPTION OF THE DRAWING FIGURES

For a better understanding of the present invention and to show more clearly how it may be carried into effect, reference will now be made, by way of example, to the accompanying drawings, which show preferred embodiments of the present invention and in which:

FIG. 7A shows a schematic of part of spectrometer of FIG. 2, showing the collisional interface and indicating applied voltages;

FIGS. 7B, 7C and 7D show different operating regimes of the mass spectrometer of FIG. 2;

Figure 9:
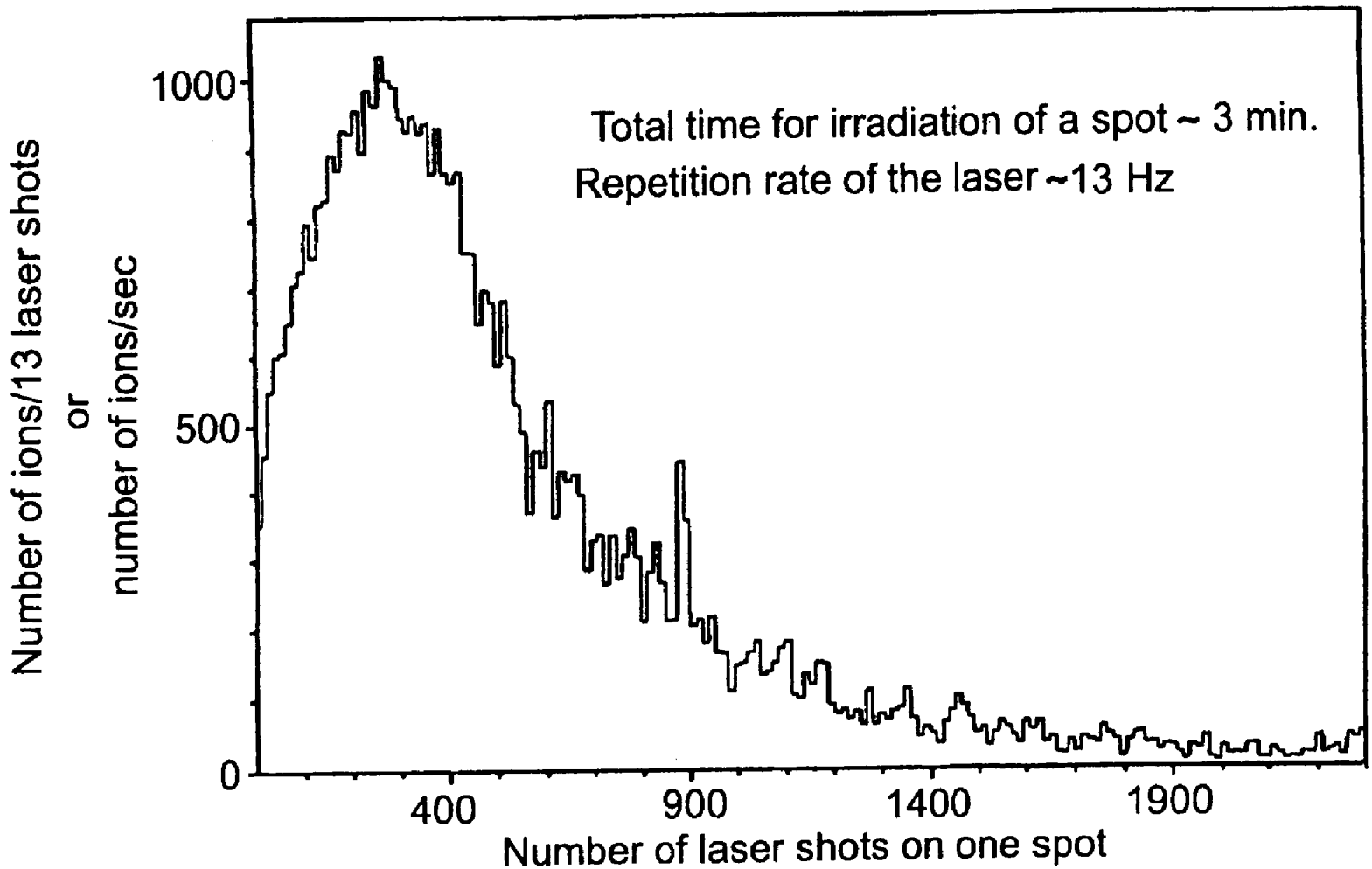
Figure 10:
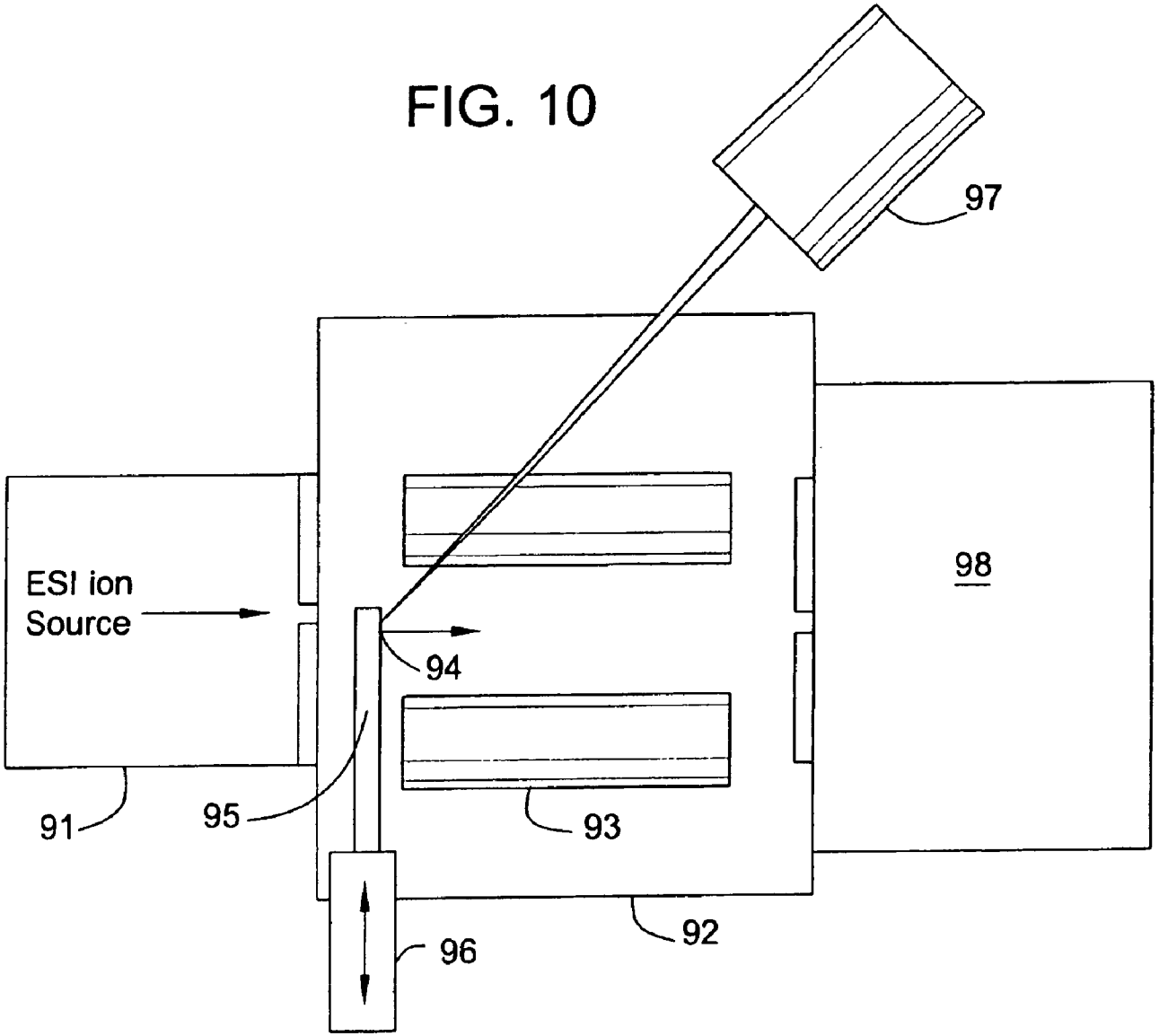

FIGS. 8A, 8B, 8C, and 8D are mass spectra obtained from substance P recorded in the different operation regimes, according to FIGS. 7B, 7C, and 7D;

FIG. 9 shows the behaviour of the ion current from a single target spot as a function of time; and FIG. 10 shows schematically combined ESI and MALDI sources for a mass spectrometer.

Figure 1:
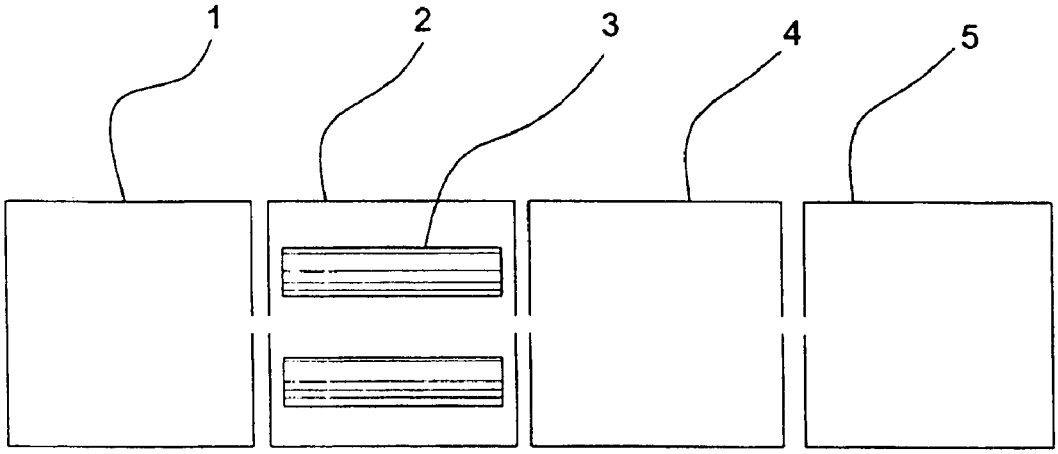
FIG. 1 shows a block diagram of a mass spectrometer system.
Figure 11:
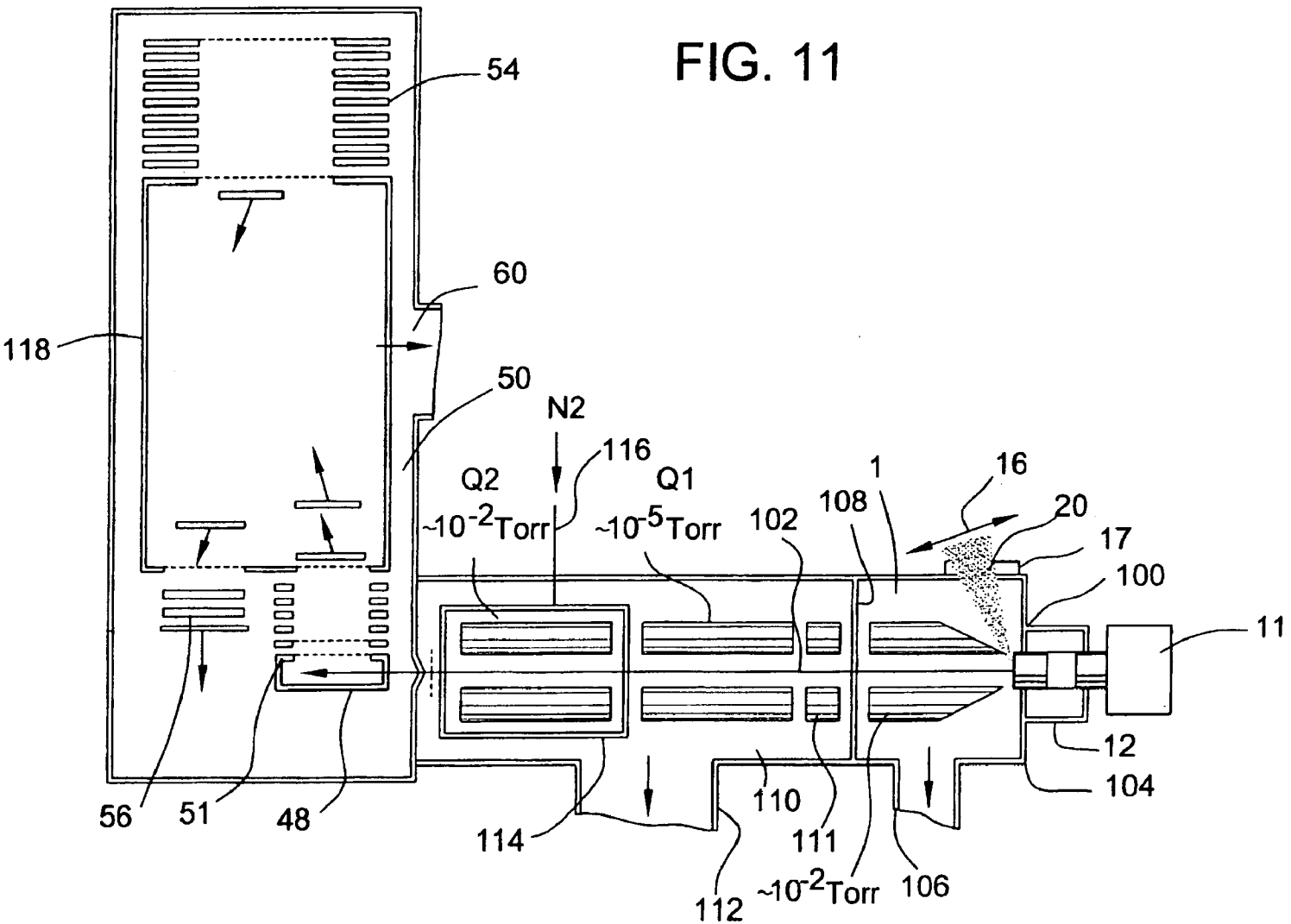
Figures 12A, 12B, 12C:
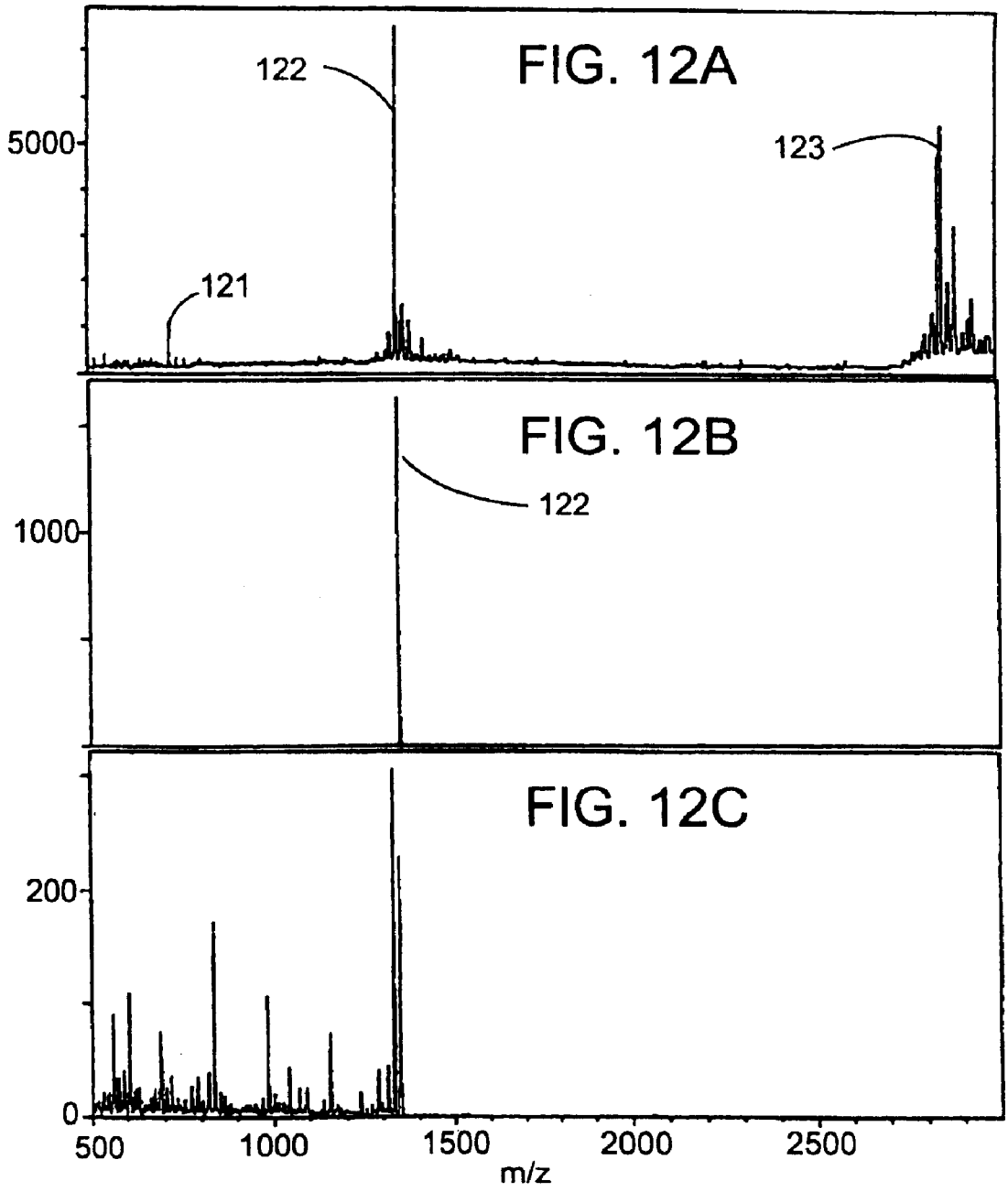
Figure 13:
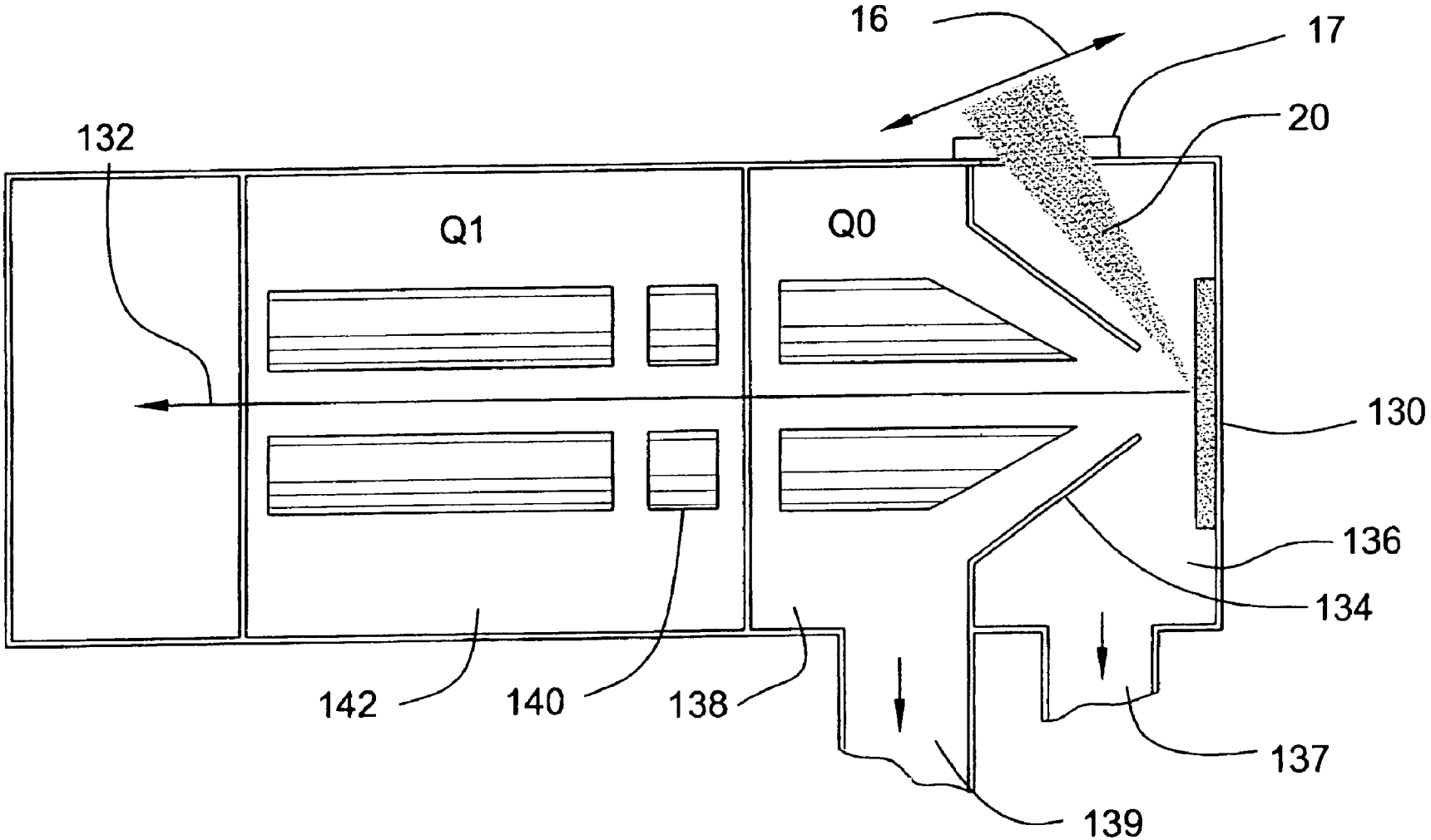
Figure 14:
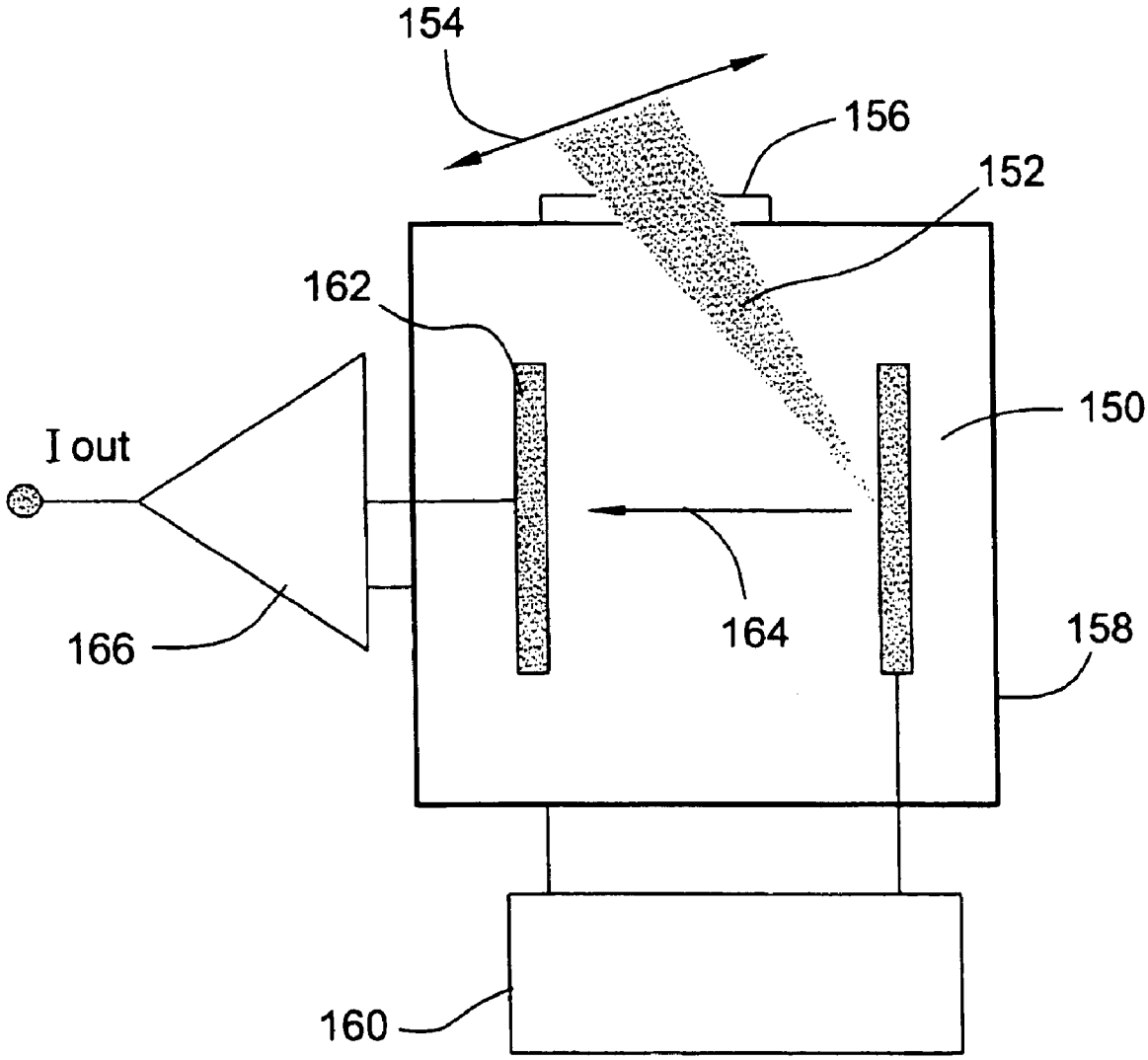
Figure 15:
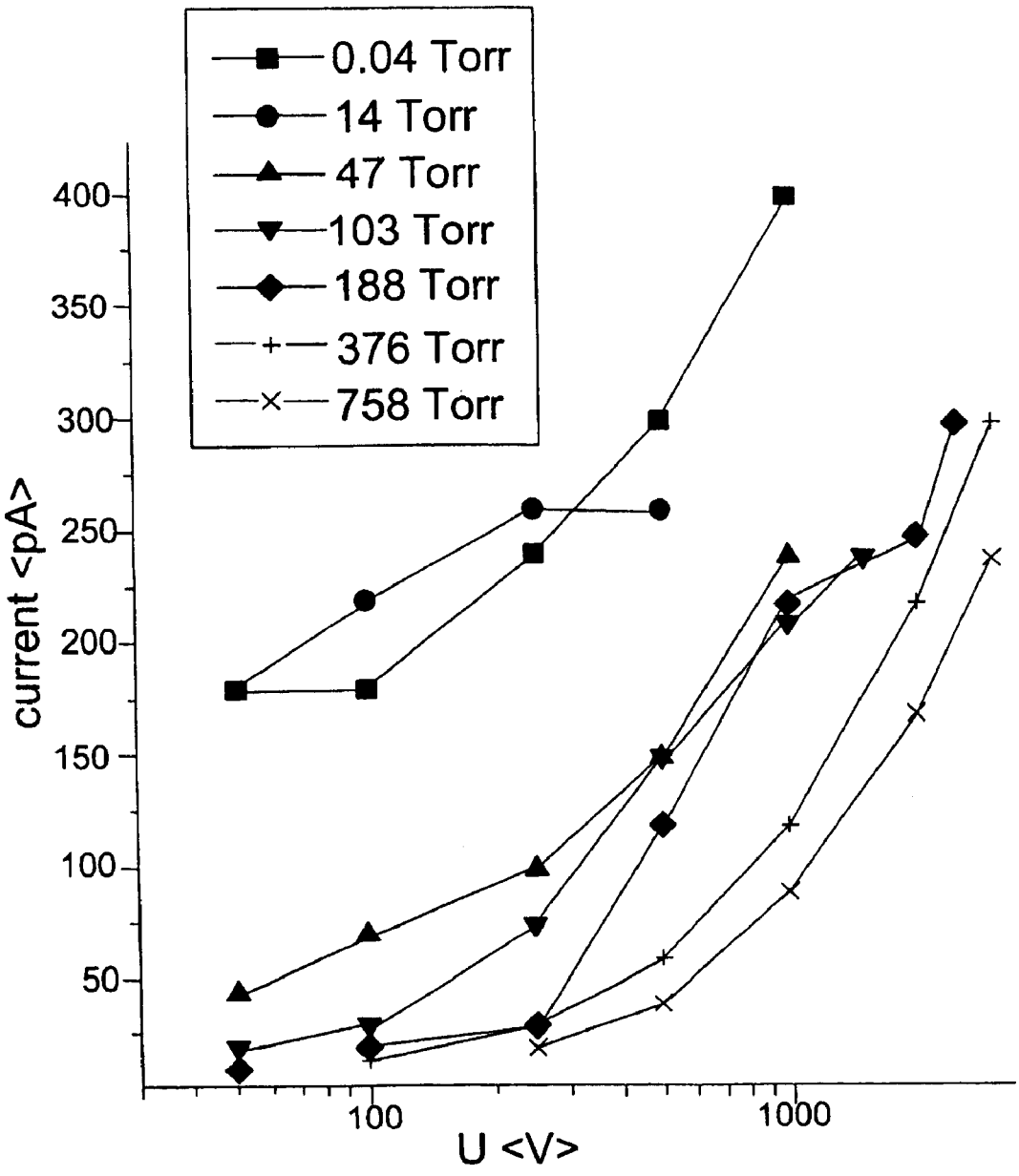

FIG. 11 shows a MALDI-QqTOF mass spectrometer utilizing a collisional damping interface including extra ion manipulation stages which are added between the interface and the time-of-flight mass spectrometer, FIGS. 12A, 12B and 12C show mass spectra obtained on a MALDI-QqTOF of FIG. 1 in a single MS and MS—MS modes;

FIG. 13 shows an alternative collisional damping setup for the MALDI-QqTOF mass spectrometer of FIG. 11, where ion velocities are partially damped in a region without RF fields;

FIG. 14 shows an experimental apparatus which was used to investigate the effect of pressure and electric field strength on the MALDI ion current; and FIG. 15 is a graph showing the total ion current produced by MALDI source shown in FIG. 14 as a function of voltage difference applied at different pressures in the chamber.

DETAILED DESCRIPTION OF THE PREFERRED EMBODIMENTS

The first embodiment shown in FIG. 1 is a block diagram of a general mass spectrometer system. Here 1 represents any sort of pulsed ion source (for instance MALDI), 2 is a collisional focusing chamber or region filled with a buffer gas and with a multipole 3 driven at some RF voltage. This is followed by an optional manipulation stage 4 and then a mass analyzer 5. The collisional ion guide 3, in accordance with the present invention, spreads the pulsed ion beam in time, and improves its team quality (i.e. space and velocity distributions) by damping the initial velocity and focusing the ions toward the central axis. The beam is then quasi-continuous and may enter an optional manipulation stage 4, where ions can be subjected to any sort of further manipulation. Finally the resultant ions are analyzed in the mass analyzer 5.

A simple example of further manipulation in stage 4 is dissociation of the ions by collisions in a gas cell, so that the resulting daughter ions can be examined in the mass analyzer. This may be adequate to determine the molecular structure of a pure analyte. If the analyte is a complex mixture, stage 4 needs to be more complicated. In a triple quadrupole or a QqTOF instrument (as disclosed in A. Shevchenko et al, Rapid Commun. Mass Spectrom. 11, 1015, (1997)), stage 4 would include a quadrupole mass filter for selection of a parent ion of interest and a quadrupole collision cell for decomposition of that ion by collision-induced dissociation (CID). Both parent and daughter ions are then analyzed in section 5, which is a quadrupole mass filter in the triple quadrupole, or a TOF spectrometer with orthogonal injection in the QqTOF instrument. In both cases stages 1 and 2 would consist of a pulsed source and a collisional damping ion guide.

It will be appreciated that the collisional focusing chamber 2 is shown with a multipole rod set 3, which could be any suitable rod set, e.g. a quadrupole, hexapole or octopole. The particular rod set selected will depend upon the function to be provided.

Alternatively, a radio frequency ring guide could be used for the collisional focusing device, and ion creation could be performed within the volume defined by the radio frequency field in order to contain the ions.

Figure 2:
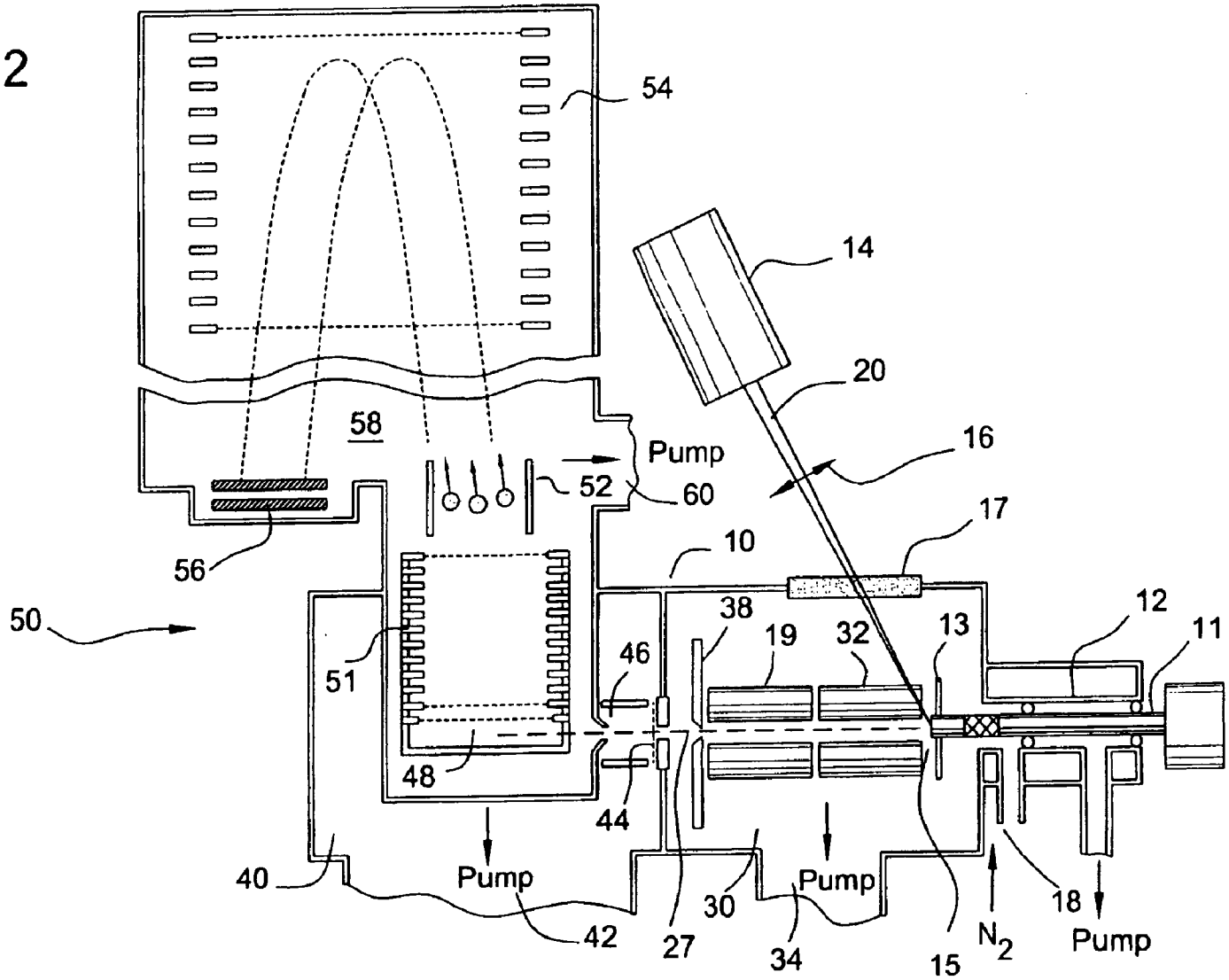
FIG. 2 is a schematic diagram showing a MALDI-TOF mass spectrometer with orthogonal injection of the MALDI ions into the spectrometer through a collisional damping interface (quadrupole ion guide) according to the present invention.

FIG. 2 shows a preferred embodiment of a MALDI-TOF mass spectrometer 10 according to the present invention. The spectrometer 10 includes a conventional MALDI target probe 11, a shaft send chamber 12, pumped in known manner, and a target installed in the target-holding electrode 13. A mixture of the sample to be investigated and a suitable matrix is applied to the sample probe following the usual procedure for preparing; MALDI targets. A pulsed laser 14 is focused on the target surface 15 by lens 16, and passes through a window 17. The laser beam is indicated at 20, and the laser is run at a repetition rate of anywhere from below a few Hz to tens of kHz, more specifically in this embodiment tested at a rate of 13 Hz. An inlet 18 is provided for nitrogen or other neutral gas. Each laser shot produces a plume of neutral and charged molecules. Tons of the sample analyte are produced and entrained in the plume which expands into vacuum chamber 30, which contains two quadrupole rod sets 31 and 32. Chamber 30 is pumped by a pump (not shown) connected to port 34 to about 70 mTorr but the pressure can be varied over a substantial range by adjusting the flow of gas through a controlled leak valve 18. Pressures of up to 1 atmosphere could also be used in the ion generation region, by putting the ionization region in a chamber which is upstream of chamber 30, and providing a small aperture through which ions are pulled into chamber 30. Lower pressures could be used, and an important characteristic is the product of pressure and rod length. Thus, a total length×pressure value of at least 10.0 mTorr-cm could be used, although a value of 22.5 mTorr-cm, as in U.S. Pat. No. 4,963,736, is preferred. The gas in chamber 30 (typically nitrogen or argon or other suitable gas, preferably an inert gas) will be referred to as a damping gas or cooling gas or buffer gas.

In the embodiment tested, the quadrupole rod sets 31 and 32 were made of rods 4.45 cm in length and 11 mm in diameter, and were separated by 3 mm, i.e. the spacing between rods on adjacent corners of the rod set. The quadrupoles 31 and 32 are driven by a power supply which provides operating sine wave frequencies from 50 kHz to 2 MHz, and output voltages from 0 to 1000 volts peak-to-peak. Typical frequencies an 200 kHz to 1 MHz, and typical voltage amplitudes are 100 to 1000 V peak-to-peak. Both quadrupoles are driven by the same power supply through a transformer with two secondary coils. Different amplitudes may be applied to the quadrupoles by using a different number of turns in the two secondary coils. D.C. Bias or offset potentials are applied to the rods of quadrupoles 31 and 32 and to the various other components by a multiple-output power supply. The RF quadrupoles 31 and 32, with the damping gas between their rods can be run in an RF-only mode, in which case they serve to reduce the axial energy, the radial energy, and the energy spreads, of the ions which pass through it, as will be described. This process substantially spreads the plume of ions out along the ion path, changing the initial beam, pulsed at about 13 Hz, into a quasi-continuous beam as described in more detail below. The first quadrupole 31, can also be run in a mass-filtering mode by the application of a suitable DC voltage. The second quadrupole 32 can then be used as a collision cell (and an RF-guide) in collision-induced dissociation experiments (see below).

From chamber 30, the ions pass along an ion path 27 and through a focusing electrode 19 and then pass through orifice 38, into a vacuum chamber 40 pumped by a pump (not shown) connected to a port 42. There, the ions are focused by grids 44 through a slot 46 into an ion storage region 48 of a TOF spectrometer generally indicated at 50.

In known manner, ions are extracted from the storage region 48 and are accelerated through a conventional accelerating column 51 which accelerates the ions to an energy of approximately 4000 electron volts per charge (4 keV). The ions travel in a direction generally orthogonal to the ion path 27 between the ion storage region, through a pair of deflection plates 52. The deflection plates 52 can serve to adjust the ion trajectories, so that the ions are then directed toward a conventional electrostatic ion mirror 54, which reflects the ions to a detector 56 at which the ions are detected. The ions are detected using single-ion counting and recorded with a time-to-digital converter (TDC). The accelerating column 51, plates 52, mirror 54 and detector 56 are contained in a main TOF chamber 58 pumped to about $2\times10^{-7}$ Torr by a pump (not shown) connected to a port 60.

The use of orthogonal-injection of MALDI ions from source 13 into the TOF spectrometer 50 has some potential advantages over the usual axial injection geometry. It serves to decouple the ion production process from the mass measurement to a greater extent than is possible in the usual delayed-extraction MALDI. This means that there is greater freedom to vary the target conditions without affecting the mass spectrum, and the plume of ions has more time to expand and cool before the electric field is applied to inject them into the spectrometer. Some improvement in performance might also be expected because the largest spread in velocities is along the ejection axis, i.e. the ion path 27, normal to the target, which in this case is orthogonal to the TOF axis. However, orthogonal injection of MALDI ions into the TOF 50 without collisional cooling has several problems which appear to make the geometry impractical, namely:

(1) The radial energy distribution, while much smaller than the axial energy is still sufficient to cause substantial spreading and expansion of the beam as it leaves the quadrupole rod set 32 and travels toward the TOF axis. The spatial spread of the beam along the TOF axis limits the resolution. The effect can be reduced with collimation but only at a significant sacrifice in sensitivity; a collimating slit must be placed sufficiently far from the TOF axis to avoid distorting the extraction field, and so the target must be placed far enough from the collimation slit to produce a reasonably parallel beam;

(2) The axial velocity of the ions, i.e. velocity along the ion path 27, in the plume is largely independent of mass which means the energy is mass dependent. Since the axial energy determines the direction of the trajectory after acceleration into the TOF spectrometer, instrumental acceptance (or acceptance by the TOF spectrometer) is mass dependent; i.e. there is mass discrimination. The same effect is observed when ESI ions are injected without collisional cooling as explained in detail in the prior publication mentioned above; and (3) The width of the axial energy distribution is comparable in magnitude with the axial energy itself, so the beam spreads out along its axis by an amount comparable to the separation between the target and the TOF axis. The size of the aperture which admits ions from the storage region into the spectrometer must clearly be much smaller than this to maintain a uniform extraction field, particularly if a slit is placed between the target and the TOF axis. This further reduces the sensitivity.

In delayed extraction MALDI in the usual axial geometry, i.e. not the orthogonal configuration shown, acceptance is nearly complete, and while the largest velocity spread is along the TOF axis, the well-defined target-plane perpendicular to the TOF axis allows a combination of time-lag focusing (delayed extraction with optimized values of delay and applied voltage) and electrostatic focusing (optimized value of the reflector voltage) in an ion mirror to produce resolution well above: 10,000 in some cases.

Experiments carried out by the present inventors suggest that competitive resolution could not be obtained with an acceptable signal using orthogonal injection, unless collisional cooling according to the present invention is employed. Moreover, some disadvantages of delayed-extraction MALDI—the dependence of optimum extraction conditions on mass, and the more complex calibration required—are still present in orthogonal injection MALDI without cooling although to a lesser extent than with axial injection.

The introduction of an RF quadrupole or other multipole with collisional cooling of the ions between the MALDI target and the orthogonal injection geometry avoids the problems described above while offering additional advantages. These are detailed below with reference to the remaining figures.

By reducing the radial energies of the ions, an approximately parallel beam can be produced, greatly reducing the losses that result from collimation before the ions enter the storage region. This allows the use of a larger entrance aperture to the TOF spectrometer 50, further reducing losses. By reducing the axial energies of the ions, and then reaccelerating them to a uniform energy, the mass discrimination mentioned above is not present.

Figure 3:
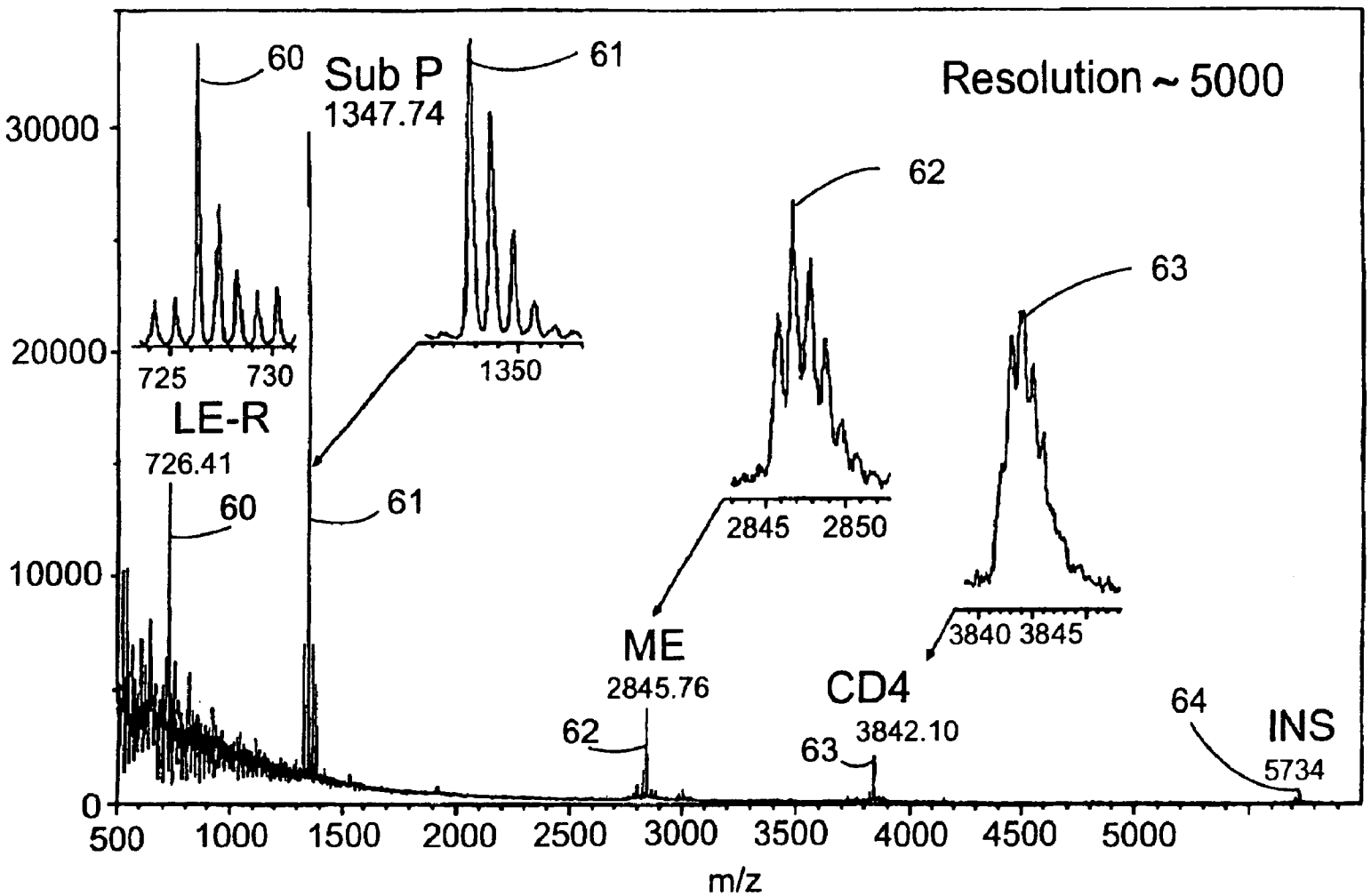
FIG. 3 shows a mass spectrum of a mixture of several peptides and proteins leucine-enkephalin-Arg (Le-R), substance P (Sub P), melittin (ME), CD4 fragment 25–58 (CD4), and insulin (INS) ) produced in the spectrometer of FIG. 2.

The uniform energy distributions of the ions after cooling remove any mass dependence on the optimum extraction conditions and allow the simple quadratic relation between TOF and mass to be used for calibration with two calibrant peaks. FIG. 3 shows a spectrum of an equimolar mixture of several peptides and proteins from mass 726 to 5734 Da in an α-cyano-4-hydroxy cinnamic acid matrix. The spectrum was acquired in a single run and shows uniform mass resolution ($M/\Delta M_{FWHM}$) of about 5000 throughout the mass range. Using a simple external calibration with substance P and melittin, the mass determination for each of the molecular ions is accurate within about 30 ppm. Here, the peaks for the various substances are identified as: peak 60 for Leucine-enkephalin; peak 61 for substance P; peak 62 for Melittin; peak 63 for CD4 fragment 25–28; and peak 64 for insulin. All peaks are identified both on the overall spectrum and as an enlarged partial spectrum. The resolution demonstrated in FIG. 3 is rather close to the resolution obtainable with the same instrument using an ESI source. In the present embodiment, the entrance orifice was made slightly larger than normally used in ESI, approximately 1 mm diameter as compared to a normal diameter of around ⅓ mm, to make adjustments easier in the preliminary experiments. This does not appear to have been necessary so it is reasonable to expect improved resolution if a smaller orifice is used. Resolution up to 10,000 has been obtained with ESI ions in the same instrument and in the MALDI-QqTOF instrument described below.

The decreasing relative intensity of the molecular ions with mass is to some extent a reflection of the decreasing detection efficiency with increasing mass. Detection efficiency depends strongly on velocity, which decreases with mass for singly-charged ions at a given energy. In this embodiment the energy of singly-charged ions is only about 5 keV (compared to 30 keV in typical MALDI experiments), so the detection efficiency limits the practical range of application to less than about 6000 Da. The relative intensities of the molecular ion peaks in FIG. 3 is consistent with that observed from the same sample when analyzed in a conventional MALDI experiment using 5 kV acceleration. The detection efficiency in the present embodiment can be increased by increasing the voltage which accelerates the ions into the spectrometer, or by increasing the voltage on the detector.

Figure 4:
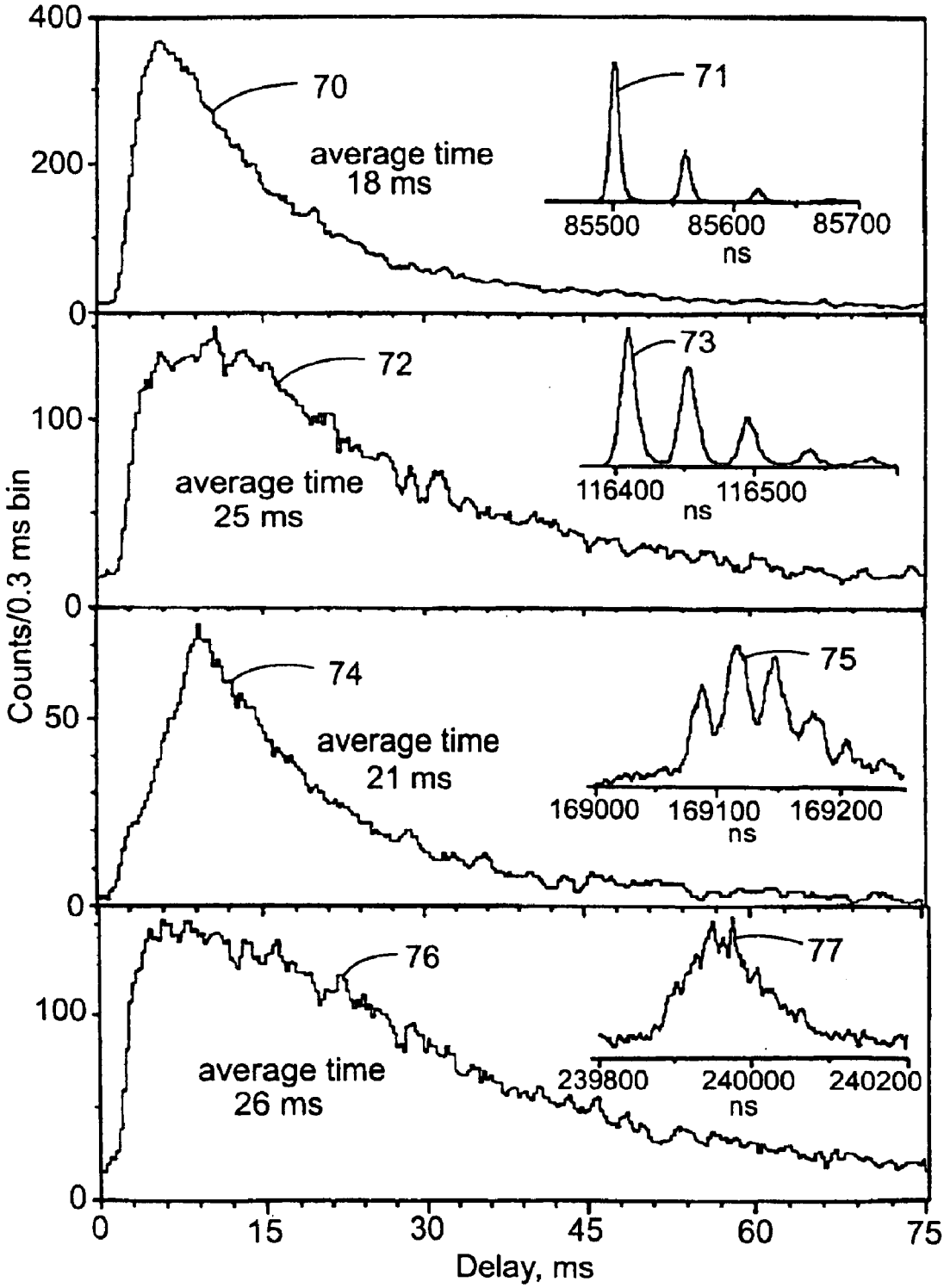
FIG. 4 shows plots of transit times through the interface for different ions.

As mentioned above, the collisional cooling spreads the ions out along the ion beam axis changing the initial beam pulsed at 13 Hz into a quasi-continuous beam. This is illustrated in FIG. 4 which shows the count rate as a function of time after the laser pulse; i.e. the distribution of transit tunes through the ion guide. The width of the time distribution is on the order of 20 ms which represents an increase in the time spread by a factor of at least $10^7$ as each laser pulse is about 2 ns long. It will be appreciated that it is not necessary to produce a time distribution of the order of 20 ms; for example the quasi-continuous pulse could be as short as 0.1 ms. Dispersion along the axis is a disadvantage in orthogonal-injection MALDI without cooling, but with the present invention, since optimum extraction conditions do not depend on the time delay after the laser shot, multiple injection pulses into the TOF storage region 48 can be used for each laser shot. In the present embodiment, 256 injection pulses into the TOF storage region 48 were used for every laser shot. The losses are then determined by the duty cycle of the instrument which in this case is about 20%. The duty cycle is the percentage of the time that ions can be injected from the storage region into the TOF spectrometer, here, it effectively means the fraction of the time, the TOF storage region 48 is available to accept ions. A quasi-continuous beam is in fact an advantage in this mode of operation. Approximately $10^4$ to $10^6$ ions are ejected from the target probe with every laser shot at a repetition rate of 13 Hz, but as a result of spreading along the beam axis or ion path 27 (and some losses) approximately 2 to 5 ions are injected into the instrument with every injection pulse less than one ion on average of a particular species. This allows single-ion counting to be used with a TDC (Time to Digital Converter), which makes the combination of high timing resolution (0.5 ns) and high repetition rate (essential for maximum duty cycle) technically much simpler than using a transient recorder which is necessary in conventional MALDI experiments. In addition, the use of single-ion counting eliminates problems with detector shadowing from intense matrix peaks, and problems with peak saturation which require attention in conventional MALDI because of the strong dependence of the signal on laser fluence and the shot-to-shot variation. Finally, single-ion counting places much more modest demands on the detector and amplifier time resolution because the electronic reduction and digitization of the pulse is quite insensitive to the detector pulse shape.

In FIG. 4, four graphs are, shown of the count rate against time, for leucine-enkephalin shown at 70, substance P shown at 72, Melittin shown at 74 and insulin shown at 76. Additionally, for each of these substances, graphs or spectra 71, 73, 75 and 77, are inserted showing normal TOF spectra, similar to FIG. 3.

Figure 5:
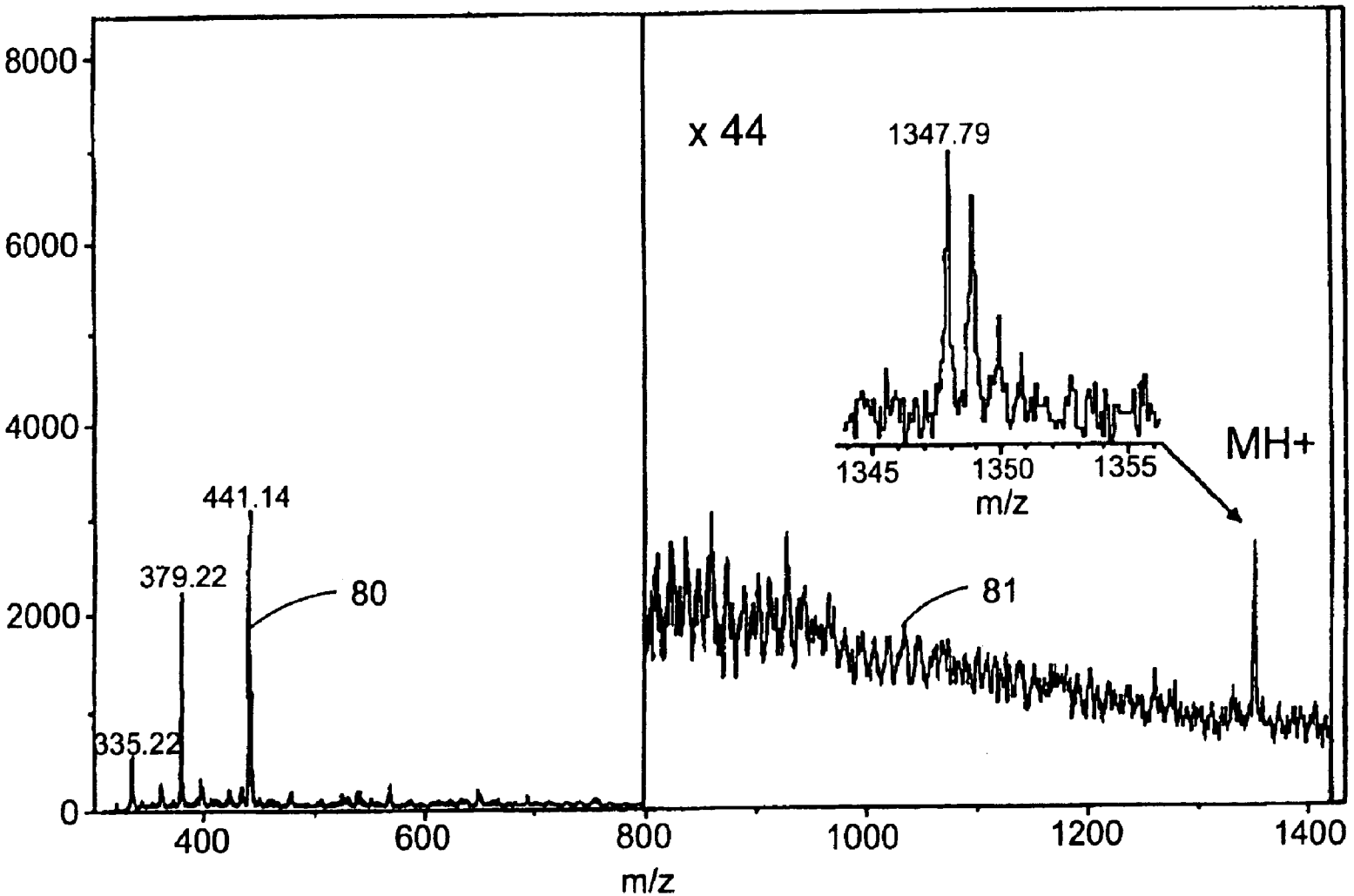
FIG. 5 shows a mass spectrum of substance P.

Assuming $10^4$ ions of a single molecular ion species are produced with each laser shot, the transmission efficiency of the RF-quadrupole is in the range of 10%. Taking account of the duty cycle, about 2% of the ions produced at the target are detected in the mass spectrometer. This represents significant losses compared to the conventional axial MALDI experiment in which transmission is probably 50% or more. However, from the point of view of data rate, the losses can be compensated to a large extent by the higher repetition rate and higher fluence of the laser. In these experiments, the repetition rate was 13 Hz, but can easily be increased to 20 Hz with the current laser, or in principle up to at least 100 Hz before the, counting system becomes saturated. In contrast, the usual MALDI experiment is run at about 1 or 2 Hz. The laser fluence in a conventional MALDI experiment must be kept close to threshold to achieve the best performance, the threshold being the minimum energy necessary to cause vaporization of the sample to produce a useful signal using a conventional transient recording with analog to digital conversion. In the present invention, the laser fluence can be increased to the fluence at which the ion production process saturates. As the quadrupole serves to smooth out the ion burst produced by the laser, a short intense burst of ions ran be accepted. From the point of view of absolute sensitivity, it seems that the independence of the spectrum on laser conditions (see below) allows more efficient usage of the sample, deposited on the target. Using fluence several times higher than threshold produces ions until the matrix is completely removed from the target probe. FIG. 5 shows that the practical sensitivity achieved with substance P is in the same range as that obtainable with conventional MALDI. Five femtomoles of substance P were applied to the target using 4HCCA as the matrix. The left hand side of the spectrum is indicated at 80, and the right hand side is shown enlarged by a factor of 44 as indicated at 81. A portion of this spectrum is shown enlarged at 82 showing the molecular ion ($MH^+$).

Figure 6:
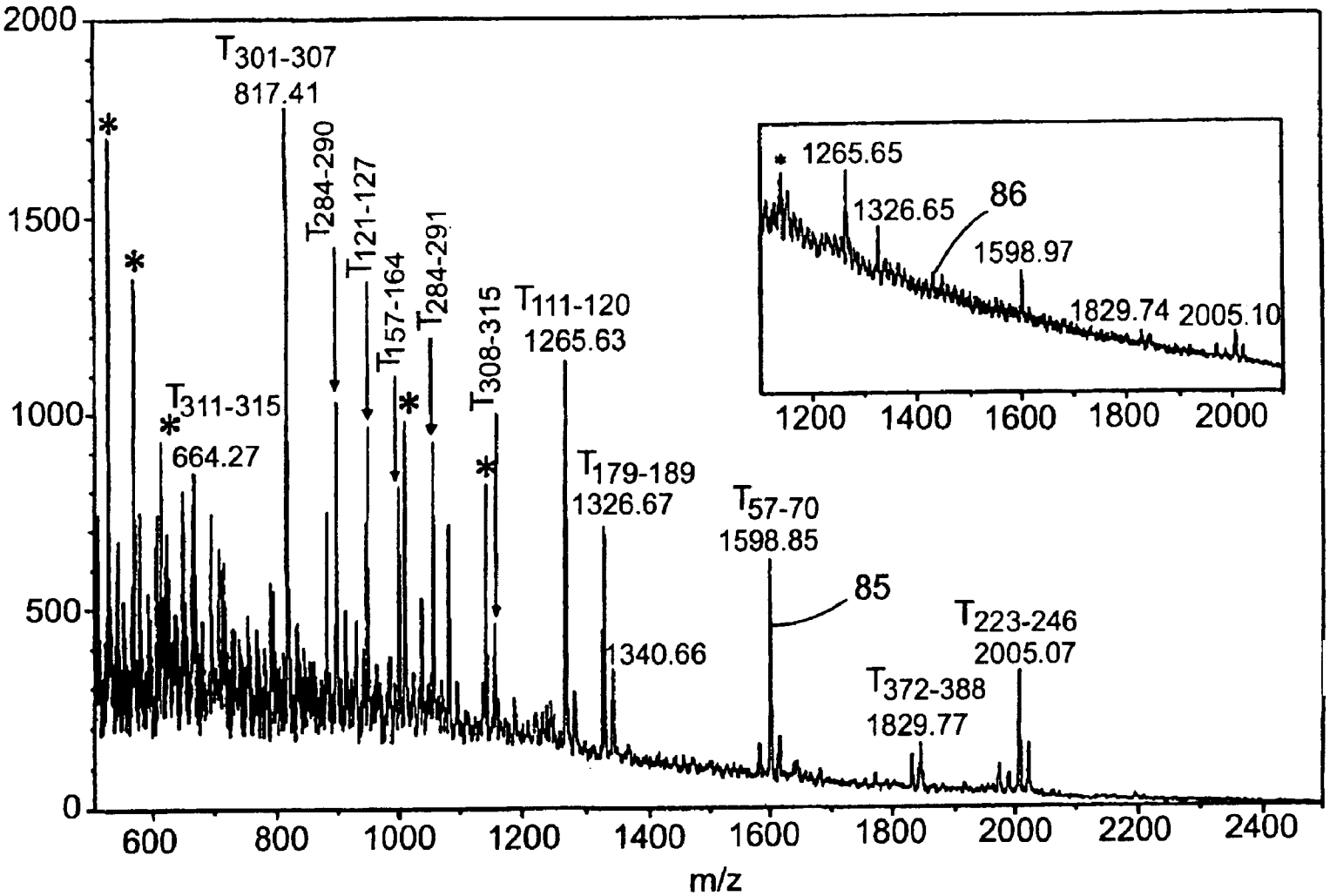
FIG. 6 shows a mass spectrum of a tryptic digestion of citrate synthase.

FIG. 6 shows the spectrum 85 obtained from a tryptic digest of citrate synthase again showing the uniform mass resolution over the mass range; the inset 86 shows the spectrum obtained from 20 fmoles applied to the target.

These results indicate that the performance of the invention for peptides is comparable to conventional MALDI experiments but with the advantage of a mass-independent calibration, and a simple calibration procedure. However, the most important advantages result from the nearly complete decoupling of the ion production from the mass measurement. In a conventional MALDI experiment, the location of the laser spot on the target and the laser fluence and location must be carefully selected for optimum performance, and these conditions are typically different for different matrices and even for different target preparation methods. The situation was improved with the introduction of delayed extraction but even so, many commercial instruments have implemented software to adjust laser fluence, detector gain, and laser position, and to reject shots in which saturation occurs. None of these techniques are necessary with the present invention. The performance obtained shows no dependence on target or laser conditions. The laser is simply set to maximum fluence (several times the usual threshold) and left while the target is moved to a fresh position occasionally. This means that alternative targets can easily be tried (including insulating targets), and alternative lasers with different wavelengths or pulse widths can be used.

The decoupling of the ion production from the mass measurement also provides an opportunity to perform various manipulations of the ions after ejection but before mass measurement. One: example is parent ion selection and subsequent fragmentation (MS/MS). This is most suitably done with an additional quadrupole mass filter as described below, but even in the present embodiment of FIG. 2, some selectivity and fragmentation is possible.

FIGS. 7A, 7B and 7C show three different modes of operation of the instrument shown in FIG. 2. The reference numerals of FIG. 2 are provided along the z axis to indicate correspondence between potential level and the different elements of the apparatus. Voltages for the quadrupole sections 31, 32 are indicated respectively at $U_1$ (t) and $U_2$ (t).

FIG. 7A shows the simple collisional ion guide mode that was used in obtaining the results shown in FIGS. 4–6. Here the same amplitudes of RF voltage and no DC offset voltages are applied to different sections of the quadrupole. Potential differences in the longitudinal direction are kept small to minimize fragmentation due to CID.

FIG. 7B shows a mass filtering mode, which is analogous to the same filtering mode implemented in conventional quadrupole mass filters. Here a DC offset voltage V is added to the first section of the quadrupole to select an ion of interest, while the second section again acts as an ordinary ion guide since there is no CID because of the small potential difference between the sections. The amplitude of the voltage applied in the second quadrupole section 32 is only one third of the voltage applied in the first section 31.

FIG. 7C is an MS—MS mode which differs from the mode of FIG. 7B by a higher potential difference between the quadrupole sections 31, 32, so ions are accelerated in that region and enter the second section with high kinetic energy, the additional energy being indicated as Δ collision energy. In that case the second section acts as an collision cell and parent ions are decomposed there by collisions with the buffer gas (CID). Again, the amplitude of the RF voltage in the second section is only one third of the amplitude of the RF voltage in the first section, which allows daughter ions much lighter than the parent ions to have stable trajectories and to be transmitted through the second quadrupole.

FIG. 8 shows examples of the spectra obtained in the different modes illustrated in FIG. 7, and in particular gives an example of possible beam manipulation. All the spectra were acquired using the same initial sample.

Figures 8A, 8B, 8C, 8D:
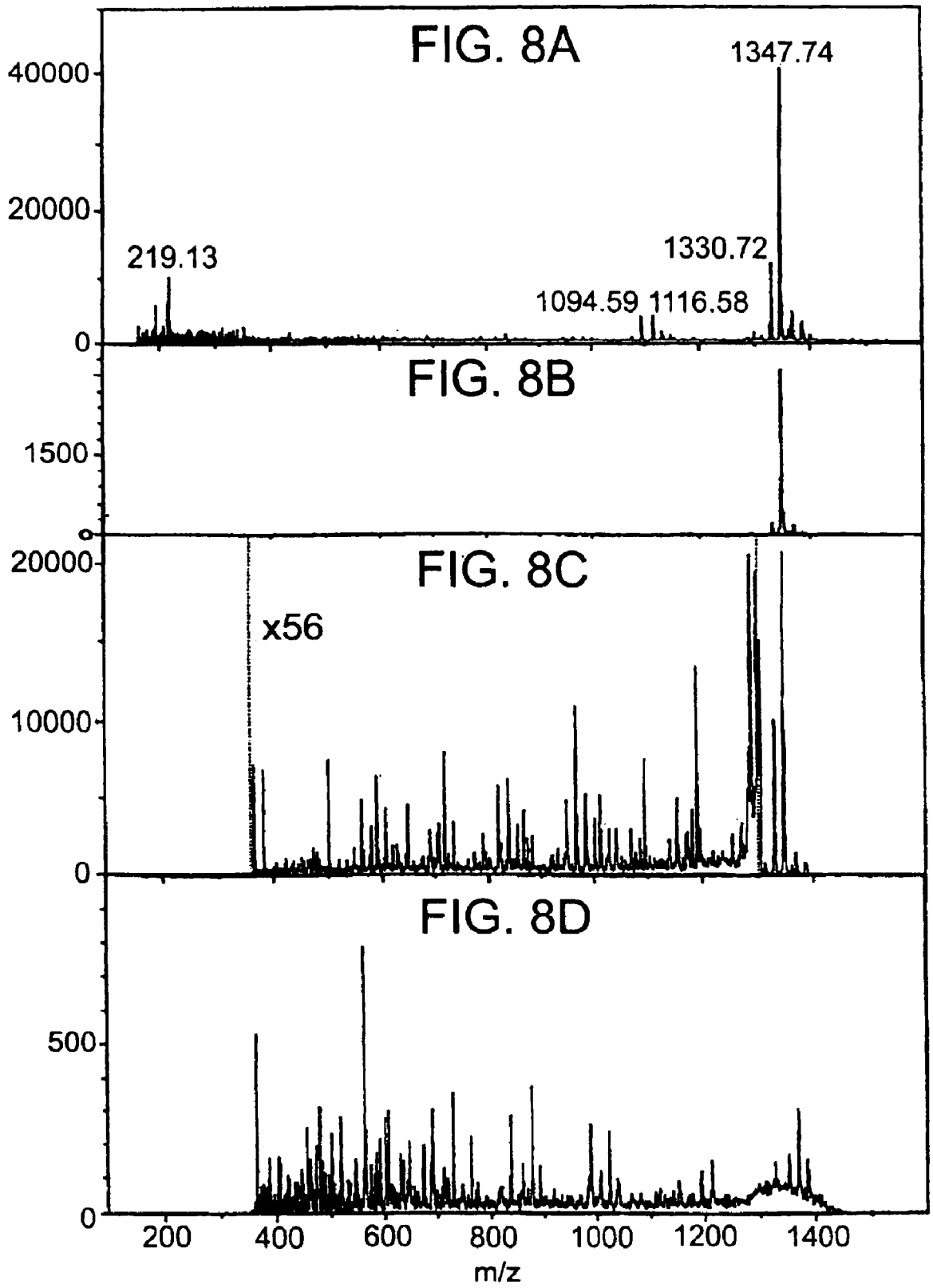

FIG. 8A is a mass spectrum where ions were cooled in a collisional focusing ion guide (the mode of FIG. 7A).

FIG. 8B is an example where ions of interest were selected in the first quadrupole 31 and cooled in the second quadrupole 32 section (the mode of FIG. 7B). Once ions of interest have been selected, they can be used for fragmentation in CID to obtain detailed information on composition and structure.

FIG. 8C presents an MS/MS spectrum of substance P obtained in this way. Molecular ions of substance P are selected in the first quadrupole section and fragmented by collisions in the second quadrupole section (according to the mode of FIG. 7C. The potential difference, Δ collision energy, between the lint and second quadrupoles was 100V. The intensities of the: fragment ions were small in comparison with intensity of the primary ion so the region inside dotted lines is expanded by a factor of 56. FIG. 8D shows the spectrum obtained in the same mode but where the potential difference between the quadrupoles 31, 32 was 150 V. In this case, more fragment ions are observed and the parent ion peak is substantially reduced.

FIG. 9 shows how long a signal from the same spot on a MALDI target can last. In this experiment, a given spot was irradiated by a series, of shots from the laser, running at 13 Hz. The laser intensity was two or three times the "threshold" intensity. On average the sample lasted for about one minute. The shape off the curve suggests that the laser shots dig deeper and deeper into the sample until it is exhausted At that point the laser irradiates the metallic substate, so no signal is observed.

In the past it has not been possible to use both continuous sources, such as electrospray ionization (EST), and pulsed sources, such as MALDI, in the same instrument, which would have significant advantages. To the inventors' knowledge, the only successful ESI-TOF instruments to date have been the orthogonal injection spectrometers (by the present inventors, Dodonov, and now the commercial machines by PerSeptive and others), so it appears that orthogonal injection is necessary for ESI-TOF, with or without collisional damping, although the former improves the situation, as detailed in Krutchinsky A. N., Chernushevich I. V., Spicer V. L., Ens W., Standing K. G., Journal of the American Society for Mass Spectrometry, 1998, 9, 569–579. Up to now, attempts to put MALDI on an orthogonal injection instrument have been without collisional damping (for example by the present inventors and by Guilhaus' and both gave unpromising results). The present invention enables two such sources to be available in one instrument. Here, the MALDI probe 11 in FIG. 2 can be replaced by an ESI source to enable measurement of ESI spectra in the instrument. The instrument would then be essentially the same as the one illustrated in the paper Krutchinsky A. N., Loboda A. V., Spicer V. L., Dworschak R., Ens W., Standing K. G., Rapid Commun. Mass Spectrom. 1998, 12, 508–-518. This change could of course be carried out by actually taking off one source and replacing it by the other, but a number of more convenient arrangements can be provided.

For instance FIG. 10 shows a further embodiment where the electrospray ion source 94 is attached to the input of a collisional damping interface 92, including a quadrupole, or other multipole, rod set 93. A MALDI ion source 94 is introduced on a probe 95 that enters from the side, and can be displaced in and out; for this purpose, a shaft end 96 is slidingly and sealingly fitted into the housing of (the collisional interface 92. The MALDI ion source 94 is similar to the one shown in FIG. 2 except in this case the sample is deposited onto a flat surface machined on the side of the probe shaft 95, instead of onto the end of a cylindrical probe. The sample is irradiated by a laser with corresponding optics, generally indicated at 97, and ions are transmitted to a spectrometer indicated at 98. When the EST source is operating, shaft 96 is pulled out far enough to clear the path of the EST ions. When the MALDI ion source 94 is operating the shaft 96 is inserted back so the MALDI target 94 is in the central position.

Presently, MALDI and EST techniques are often considered to be complementary methods for biochemical analysis, so many biochemical or pharmaceutical laboratories have two instruments in use. Obviously there are significant benefits of combining both ion sources in one instrument, as in the embodiments above. In particular, the cost of a combined instrument is expected to be little more than half the cost of two separate instruments. In addition, similar procedures for ion manipulation, detection and mass calibration could be used, since the ion production is largely decoupled from the ion measurement. This would simplify the analysis and processing of the separate spectra and their comparison.

The ability the use both MALDI and EST sources on a single instrument is not restricted to the spectrometer shown in FIG. 1, but is applicable to any mass spectrometer with a collisional damping interface. In particular it is applicable to the QqTOF instrument discussed above and described in more detail below.

While specific embodiments of the invention have been described, it will be appreciated that a number of variations are possible within the scope of the present invention. Thus, the apparatus could include a single multipole rod set as shown in FIG. 1, or two rod sets as shown in FIG. 2. While quadrupole rod sets are preferred, other rod sets, such as hexapole and octopole are possible, and the rod set can be selected based on the known characteristics of the different rod sets. Additionally, it is possible that three or more rod sets could be provided. Further, while FIG. 2 shows the two rod sets, 31 and 32 provided in a common chamber, the rod sets could, in known manner, be provided in separate chambers operating at different pressures, to enable different operations to be preformed. Thus, to perform conventional mass selection, there could be one chamber operating at a very low pressure so that there is little or no collisional activity between the ions and the damping gas. Further, the pressure of the gas could be varied, between different chambers, to meet the requirements for collisional damping, where a relatively large number of collisions are desired as opposed to collision induced fragmentation, where excessive collisions are not desirable.

Reference will now be made to FIG. 11. For simplicity and brevity, components common with the apparatus or spectrometer of FIG. 2 are given the same reference numeral, and a description of these components is not repeated.

Here, the MALDI target is provided at 100 and generates an ion beam indicated at 102. The MALDI target 100 is located in a differentially pumped chamber 104 connected to a pump as indicated at 106 in known manner. A fast rod set Q0 is located in the chamber 104. An aperture and an interquad aperture plate 108 provides communication through to a main chamber 110. Again, in known manner a pump connection is provided at 112.

Within the main chamber 110, there is a short rod set 111, sometimes referred to as "stubbies", provided for the purpose collimating the beam. A first quadrupole rod set in the chamber 110 is indicated at Q1 and a second rod set at Q2.

The rod set Q2 is located in it collision cell 114 provided with connection, indicated at 116, for a collision gas.

On leaving the collision cell 114, ions pass through a grid and then an aperture into the storage region 48 of the TOF instrument, again indicated at 50. Here, a TOF instrument 50 is provided with a liner 118 around the flight region.

Here, the differentially pumped chamber 104 is maintained at pressure of around $10^{-2}$ torr. The main chamber 110 is maintained at a pressure of around $10^{-5}$ torr, while the collision cell 114 is maintained at a pressure of around $10^{-2}$ torr. In known manner, the pressure in the collision cell 114 can be controlled by controlling the supply of nitrogen to it through connection 116.

Here, collisional damping of ions generating from the MALDI target 100 is accomplished by the relatively high pressure in the differentially pumped chamber 104. Ions then pass through into the quadrupole rod set Q1, which can be operated to mass select a desired ion.

The mass selected ion then enters the collision cell 114 and the rod set Q2; potentials are such that ions enter the rod set Q2 with sufficient energy to effect collision induced dissociation. The fragment ions generated by this CID are then passed into the TOF instrument 50 for analysis.

Typical spectra obtained in a MALDI-QqTOF instrument are presented in FIG. 12. The spectrum shown in FIG. 12a was obtained when Q1 was operated in a wide band mode, so all ions produced in the MALDI ion source were delivered to the TOF mass analyzer. Three peaks (121, 122, 123) in FIG. 12a correspond to ions of leucine-enkephalin, substance P and mellitin respectively. When Q1, is operated in selection mode, the spectrum shown in FIG. 12b is observed. Here Q1, was set to select only ions of substance P (peak 122) located at m/z around 1347.7. Note that no other peaks or background were observed in the mass spectrum as conditions in Q1, prevented transmission of other ions. FIG. 12c shows the result of selection at substance P (peak 122) and collisional induced dissociation of the substance P ions. In this case Q1 was set to selection mode as in FIG. 12b but the potential difference between Q0 and Q2 was increased to promote CID. The peaks observed in the lower mass region are fragments of the substance P ions.

Referring now to FIG. 13, again, like components are given the same reference numerals as in FIGS. 11 and 2.

In FIG. 13, the MALDI source is indicated at 130 and the ion beam at 132. Here, a sampling cone 134 was placed between the MALDI source 130 and the rod set Q0. This effectively separates the differentially pumped region into a first differentially pumped region 136 and a second differentially pumped region 138. These differentially pumped regions 136, 138 are provided with respective connections 137 and 139 to pumps.

As before, a short seat of rods or stubbies 140 together with a rod set Q1, are provided in a chamber here indicated at 142.

The alternative collisional damping setup of FIG. 13 has been implemented in MALDI-QqTOF instrument but can be used with any configuration of collisional RF ion guides such as the simpler geometry described earlier and shown in FIG. 2. In the FIG. 13 configuration, some collisional damping; is accomplished in the first region or chamber 136 where almost no RF field is present. Nitrogen is supplied to this chamber 136, as in FIG. 2, and is also supplied to the chamber 104 in FIG. 11; this is comparable to FIG. 2, although the nitrogen connection is not shown in these later figures. The pressure in this first differentially pumped region or chamber 136 is typically higher than in the second differentially pump chamber 138 and ions are dragged towards the entrance of QO by the combination of a DC field and the gas flow. In spite of the higher pressure, no significant change in the spectrum was observed. The signal Intensity in this configuration was essentially the same as in the configuration shown in FIG. 11, provided the diameter of the cone opening was larger than 1 mm. With a smaller diameter opening, the signal intensity drops down, presumably because the size of the opening becomes smaller than the diameter of the ion beam.

FIG. 14 shows an apparatus used to study the effect of pressure and electric field on the intensity of the signal produced by MALDI. MALDI ions are generated at a target 150 by a pulsed UV-laser beam 152. The laser beam 152 passed through a lens 154 and a window 156, as in the spectrometer configurations described above. The window 156 is provided in a chamber 158, whose internal pressure can be varied in known manner (connections for lumps, etc. are not shown). A potential difference U between the target 150 and a collector electrode 162 is provided by a power supply 160.

Thus, ions generated at the target 150 travel, as indicated at 164, to the collector electrode 162. An approximately homogeneous electric field is established in the region between the target 150 and the collector electrode 162. The field strength is proportional to the applied potential difference U. The distance between the target and collector was about 3 mm. The laser was operated at 20 Hz and the total ion current was measured using an amplifier 166.

FIG. 15 shows the dependence of the total ion current produced by MALDI at different pressures inside the chamber 158 as a function of the voltage applied between the target 150 and the collector electrode 162 shown in FIG. 14. It is apparent that ion yield decreases with increasing pressure, and there is a significant drop in yield between 14 and 47 Torr. However, the drop in yield can be recovered by raising the electric field strength.

These results indicate that the MALDI technique can be used at any desirable pressure, even out of the range in which RF collisional multipoles can be implemented. Collisional damping of the ions can be accomplished at least partially in the region with no RF field adjacent to the sample target. The inventors believe that similar dependence of pressure and electric field can be observed in some other pulsed ion sources and these ionization techniques can be also used with collisional damping at higher pressures.

What is claimed is:

1. A mass spectrometer system comprising:

a mass spectrometer;

a pulsed ion source for providing a plurality of plumes, each plume having a plurality of analyte ions; and an ion transmission device containing a damping gas and having at least one RF ion guide disposed on an ion path leading to the mass spectrometer, the damping gas providing collision damping on the analyte ions and the RF ion guide providing ion confinement along the ion path, such that each plume is spread into a significantly broadened and continuous packet of ions along the ion path.

2. A mass spectrometer system as in claim 1, wherein the collision damping suppresses fragmentation of the analyte ions.

3. A mass spectrometer system as in claim 1, wherein the damping gas is provided in the RF ion guide.

4. A mass spectrometer system as in claim 3, wherein the product of a pressure of the damping gas with a length of the RF ion guide is at least about 10.0 mTorr-cm.

5. A mass spectrometer system as in claim 1, wherein the ion source is at atmospheric pressure.

6. A mass spectrometer system as in claim 1, wherein the mass spectrometer comprises a time of flight mass spectrometer.

7. A mass spectrometer system as in claim 6, wherein the time of flight spectrometer has an ion detection axis perpendicular to the ion path and includes an ion extractor activated to extract multiple pulses of ions from each of the significantly broadened and continuous packets of ions for analysis by the time of flight mass spectrometer.

8. A mass spectrometer system as in claim 1, wherein the mass spectrometer comprises a quadrupole spectrometer.

9. A mass spectrometer system in claim 1, wherein the mass spectrometer comprises one of a quadrupole spectrometer, an ion trap spectrometer, a magnetic sector spectrometer and a Fourier transform mass spectrometer.

10. A mass spectrometer system as in claim 1, wherein the damping gas is provided in a differential pressure chamber containing the pulsed ion source.

11. A mass spectrometer system as in claim 1, including a first differential pressure chamber containing the pulsed ion source and a second differential pressure chamber located between the first differential pressure chamber and the mass spectrometer, and a aperture between the first and second differential pressure chambers for maintaining a pressure differential between the first and second differential pressure chambers.

12. A mass spectrometer system as in claim 11, wherein the second differential chamber contains the RF ion guide.

13. A mass spectrometer system as in claim 11, including a mass analyzer and a collision cell provided in the ion path before the mass spectrometer the mass analyzer including a multipole rod set configured to select ions of a precursor type, and the collision cell containing a collision gas for fragmenting ions of the precursor type selected by the mass analyzer into fragment ions for analysis in the mass spectrometer.

14. A mass spectrometer system as in claim 13, wherein the collision cell is provided in a separate chamber from the mass analyzer.

15. A mass spectrometer system as in claim 13, wherein the mass spectrometer is a time of flight mass spectrometer.

16. A mass spectrometer system as in claim 13, wherein the mass spectrometer is a quadrupole mass spectrometer.

17. A mass spectrometer system as in claim 1, wherein the pulsed ion source comprises a target surface containing analyte molecules and a pulsed laser directed at the target surface for providing laser pulses to cause ionization of the analyte molecules.

18. A mass spectrometer system as in claim 17, wherein the target surface contains a target material composed of analyte molecules embedded in a matrix material.

19. A mass spectrometer system as in claim 1, further including a continuous ion source disposed for providing a continuous ion beam along the ion path and means for selecting between the pulsed ion source and the continuous ion source.

20. A mass spectrometer system comprising:

a pulsed ion source for providing a plurality of plumes, each plume having a plurality of analyte ions, an ion transmission device disposed along an ion path and having an ion transmission device containing a damping gas and having at least one RF ion guide disposed on an ion path, the damping gas providing collision damping on the analyte ions and the RF ion guide providing ion confinement along the ion path, such that each plume is spread into a significantly broadened and continuous packet of ions along the ion path; and a time-of-flight mass spectrometer disposed on the ion path for analyzing the packets of ions, the time-of-flight mass spectrometer having a detection axis disposed perpendicular to the ion path and having electrodes pulsed multiple times for each packet of ions to inject ions from said each packet into a detection region.

21. A mass spectrometer system as in claim 20, wherein the damping gas is provided in the RF ion guide.

22. A mass spectrometer system as in claim 21, wherein the product of a pressure of the damping gas with a length of the RF ion guide is at least about 10.0 mTorr-cm.

23. A mass spectrometer system as in claim 20, wherein the ion source is at atmosphere pressure.

24. A mass spectrometer system as in claim 20, further including a mass analyzer and a collision cell provided in the ion path before the mass spectrometer, the mass analyzer including a multipole rod set configured to select ions of a precursor type, and the collision cell containing a collision gas for fragmenting ions of the precursor type selected by the mass analyzer into fragment ions for analysis in the mass spectrometer.

25. A mass spectrometer system as in claim 20, wherein the pulsed ion source comprises a target surface containing analyte molecules embedded in a matrix material and a pulsed laser directed at the target surface for providing laser pulses to cause ionization of the analyte molecules.

26. A mass spectrometer system as in claim 20, further including a continuous ion source disposed for providing a continuous ion beam along the ion path and means for selecting between the pulsed ion source and the continuous ion source.

27. A method of generating ions and preparing ions for mass spectrometry analysis, comprising the steps of:

activating an ion source to produce a plurality of plumes, each plume having a plurality of analyte ions;

providing an ion transmission device having a damping gas and at least one RF ion guide along an ion path;

applying collision damping by the damping gas on the analyte ions and ion confinement along the ion path by the RF ion guide, such that each plume is spread into a significantly broadened and continuous packet of ions along the ion path; and transmitting the packets of ions along the ion path toward a mass spectrometer for analysis.

28. A method as in claim 27, wherein the step of applying collision damping suppresses fragmentation of the analyte ions.

29. A method as in claim 27, wherein the damping gas is provided in the RF ion guide.

30. A method as in claim 29, wherein the step of providing includes maintaining a pressure of the damping gas to have a product of the pressure of the damping gas with a length of the RF ion guide above about 10.0 mTorr-cm.

31. A method as in claim 27, wherein the mass spectrometer comprises a time of flight mass spectrometer having an ion detection axis perpendicular to the ion path, and further including the step of applying multiple extraction pulses on each of the significantly broadened and continuous packets to extract ions into a detection region of the time of flight mass spectrometer.

32. A method as in claim 27, further including the steps of passing the packets of ions through a mass analyzer disposed in the ion path to select ions of a precursor type, and fragmenting the selected ions of the precursor type by collision induced dissociation unto fragment ions for analysis in the mass spectrometer.

33. A method as in claim 27, wherein the ion source comprises a target surface containing analyte molecules embedded in a matrix material, and wherein the step of activating the ion source includes exposing the target surface to laser pulses to cause ionization of the analyte molecules.

* * * * *